US012160676B2

(12) United States Patent
Tsuchiya et al.

(10) Patent No.: US 12,160,676 B2
(45) Date of Patent: Dec. 3, 2024

(54) PHOTOELECTRIC CONVERSION DEVICE

(71) Applicant: CANON KABUSHIKI KAISHA, Tokyo (JP)

(72) Inventors: Masayuki Tsuchiya, Kanagawa (JP); Masahiro Kobayashi, Tokyo (JP); Yasuharu Ota, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 302 days.

(21) Appl. No.: 17/937,583

(22) Filed: Oct. 3, 2022

(65) Prior Publication Data

US 2023/0118600 A1 Apr. 20, 2023

(30) Foreign Application Priority Data

Oct. 20, 2021 (JP) ................. 2021-171581

(51) Int. Cl.
*H04N 25/771* (2023.01)
*G01J 1/44* (2006.01)
*G01S 17/89* (2020.01)

(52) U.S. Cl.
CPC .............. *H04N 25/771* (2023.01); *G01J 1/44* (2013.01); *G01S 17/89* (2013.01); *G01J 2001/4466* (2013.01)

(58) Field of Classification Search
None
See application file for complete search history.

(56) References Cited

U.S. PATENT DOCUMENTS

| | | |
|---|---|---|
| 7,462,810 B2 | 12/2008 | Kobayashi |
| 7,928,477 B2 | 4/2011 | Kobayashi |
| 7,935,995 B2 | 5/2011 | Watanabe |
| 8,045,034 B2 | 10/2011 | Shibata |
| 8,063,351 B2 | 11/2011 | Kobayashi |
| 8,174,604 B2 | 5/2012 | Shibata |
| 8,222,682 B2 | 7/2012 | Watanabe |
| 8,259,206 B1 | 9/2012 | Shibata |
| 8,289,432 B2 | 10/2012 | Shibata |
| 8,357,956 B2 | 1/2013 | Kobayashi |
| 8,456,559 B2 | 6/2013 | Yamashita |
| 8,552,353 B2 | 10/2013 | Kobayashi |
| 8,723,232 B2 | 5/2014 | Kobayashi |

(Continued)

FOREIGN PATENT DOCUMENTS

| | | |
|---|---|---|
| JP | 2019-9768 A | 1/2019 |
| JP | 2020-123847 A | 8/2020 |

*Primary Examiner* — Mark T Monk
(74) *Attorney, Agent, or Firm* — VENABLE LLP

(57) ABSTRACT

A photoelectric conversion device includes a photodiode configured to perform avalanche multiplication, a recharging circuit configured to perform a recharging operation to bring the photodiode after the avalanche multiplication into a state in which the avalanche multiplication can be performed again based on a first control signal including pulses that periodically repeat transitions from a first level to a second level, and a counter configured to count the number of occurrences of the avalanche multiplication by being enabled based on a second control signal. Before the counter is enabled based on the second control signal, the first control signal transitions from the first level to the second level and transitions from the second level to the first level.

12 Claims, 17 Drawing Sheets

(56) References Cited

U.S. PATENT DOCUMENTS

| | | | | |
|---|---|---|---|---|
| 8,884,391 | B2 | 11/2014 | Fudaba | |
| 9,136,407 | B2 | 9/2015 | Tsuchiya | |
| 9,147,708 | B2 | 9/2015 | Okita | |
| 9,153,610 | B2 | 10/2015 | Kobayashi | |
| 9,276,027 | B2 | 3/2016 | Okita | |
| 9,344,653 | B2 | 5/2016 | Shimotsusa | |
| 9,419,038 | B2 | 8/2016 | Kobayashi | |
| 9,445,026 | B2 | 9/2016 | Kobayashi | |
| 9,538,112 | B2 | 1/2017 | Wada | |
| 9,548,328 | B2 | 1/2017 | Hasegawa | |
| 9,681,078 | B2 | 6/2017 | Tsuchiya | |
| 9,716,849 | B2 | 7/2017 | Kobayashi | |
| 9,768,213 | B2 | 9/2017 | Soda | |
| 9,818,794 | B2 | 11/2017 | Okita | |
| 9,876,975 | B2 | 1/2018 | Yoshida | |
| 9,894,295 | B2 | 2/2018 | Kawabata | |
| 9,906,743 | B2 | 2/2018 | Shimotsusa | |
| 9,966,395 | B2 | 5/2018 | Kato | |
| 10,009,560 | B2 | 6/2018 | Kobayashi | |
| 10,021,321 | B2 | 7/2018 | Kawabata | |
| 10,057,519 | B2 | 8/2018 | Kobayashi | |
| 10,158,817 | B2 | 12/2018 | Shimotsusa | |
| 10,186,532 | B2 | 1/2019 | Kobayashi | |
| 10,205,894 | B2 | 2/2019 | Kawabata | |
| 10,283,546 | B2 | 5/2019 | Kobayashi | |
| 10,321,087 | B2 | 6/2019 | Yoshida | |
| 10,424,613 | B2 | 9/2019 | Tsuboi | |
| 10,453,879 | B2 | 10/2019 | Ikeda | |
| 10,462,400 | B2 | 10/2019 | Kobayashi | |
| 10,483,307 | B2 | 11/2019 | Sekine | |
| 10,498,979 | B2 | 12/2019 | Kobayashi | |
| 10,636,828 | B2 | 4/2020 | Kobayashi | |
| 10,638,066 | B2 | 4/2020 | Kobayashi | |
| 10,659,706 | B2 | 5/2020 | Ohya | |
| 10,727,266 | B2 | 7/2020 | Kobayashi | |
| 10,771,718 | B2 | 9/2020 | Kawabata | |
| 10,805,563 | B2 | 10/2020 | Keda | |
| 10,818,715 | B2 | 10/2020 | Iwata | |
| 10,848,695 | B2 | 11/2020 | Miki | |
| 10,991,541 | B2 | 4/2021 | Ikeda | |
| 11,019,291 | B2 | 5/2021 | Kobayashi | |
| 11,057,551 | B2 | 7/2021 | Nishide | |
| 11,114,487 | B2 | 9/2021 | Kobayashi | |
| 11,165,976 | B2 | 11/2021 | Kobayashi | |
| 11,297,273 | B2 | 4/2022 | Sekine | |
| 11,402,264 | B2 | 8/2022 | Ota | |
| 11,412,163 | B2 | 8/2022 | Kobayashi | |
| 2014/0061436 | A1 | 3/2014 | Kobayashi | |
| 2015/0281610 | A1 | 10/2015 | Ota | |
| 2019/0068903 | A1 | 2/2019 | Shimotsusa | |
| 2021/0123802 | A1* | 4/2021 | Ryoki | G01J 1/0228 |
| 2021/0218915 | A1 | 7/2021 | Kobayashi | |
| 2021/0297565 | A1 | 9/2021 | Nishide | |
| 2021/0366955 | A1 | 11/2021 | Kobayashi | |
| 2022/0021827 | A1 | 1/2022 | Kobayashi | |
| 2022/0115366 | A1 | 4/2022 | Ota | |
| 2022/0326076 | A1 | 10/2022 | Ota | |

\* cited by examiner

PHOTOELECTRIC CONVERSION DEVICE

BACKGROUND OF THE INVENTION

Field of the Invention

The present disclosure relates to a photoelectric conversion device.

Description of the Related Art

Japanese Patent Application Laid-Open No. 2020-123847 discloses a photon count type photoelectric conversion device. The photoelectric conversion device digitally counts the number of photons incident on the light receiving unit which performs avalanche multiplication, and outputs the count value as a digital signal. More specifically, the photoelectric conversion device of Japanese Patent Application Laid-Open No. 2020-123847 includes a photodiode that performs avalanche multiplication, a generation circuit that generates a control signal, and a control circuit that controls a recharging operation for returning the photodiode after the avalanche multiplication to a state in which the photodiode can perform the avalanche multiplication. Such a photoelectric conversion device can output a digital signal according to photon reception frequency.

In the photoelectric conversion device capable of performing the recharging operation as described in Japanese Patent Application Laid-Open No. 2020-123847, the state of the photodiode before the recharging operation may affect the count value of the photons.

SUMMARY OF THE INVENTION

An object of the present disclosure is to provide a photoelectric conversion device capable of further improving the accuracy of signal acquisition.

According to an aspect of the present disclosure, there is provided a photoelectric conversion device including a photodiode configured to perform avalanche multiplication, a recharging circuit configured to perform a recharging operation to bring the photodiode after the avalanche multiplication into a state in which the avalanche multiplication can be performed again based on a first control signal including pulses that periodically repeat transitions from a first level to a second level, and a counter configured to count the number of occurrences of the avalanche multiplication by being enabled based on a second control signal. Before the counter is enabled based on the second control signal, the first control signal transitions from the first level to the second level and transitions from the second level to the first level.

Further features of the present invention will become apparent from the following description of exemplary embodiments with reference to the attached drawings.

DESCRIPTION OF THE EMBODIMENTS

Figure 1:
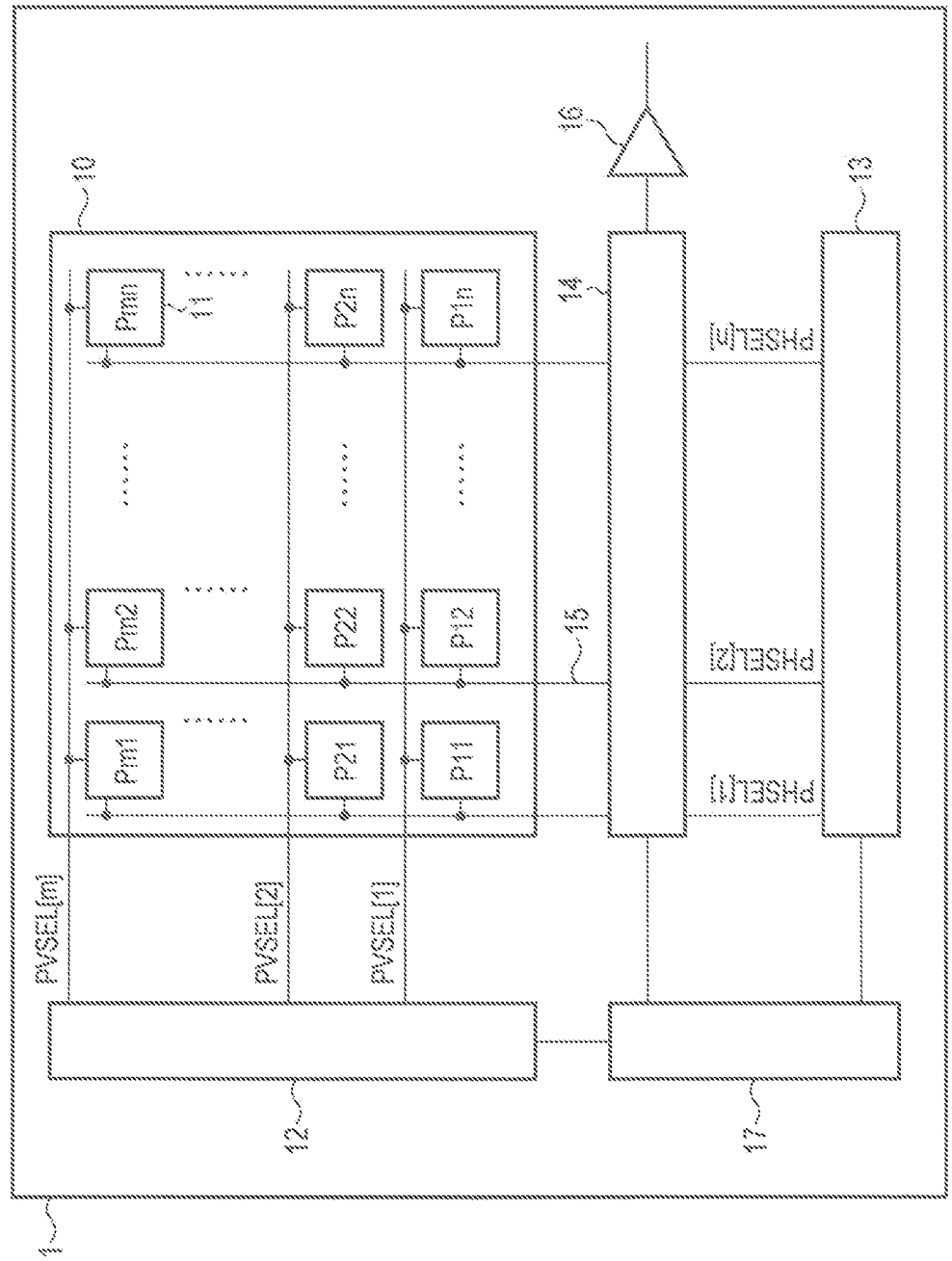
FIG. 1 is a block diagram illustrating a schematic configuration of a photoelectric conversion device according to a first embodiment.

Preferred embodiments of the present invention will now be described in detail in accordance with the accompanying drawings. In the drawings, the same or corresponding elements are denoted by the same reference numerals, and the description thereof may be omitted or simplified.

First Embodiment

A photoelectric conversion device and a driving method thereof according to the present embodiment will be described with reference to FIGS. 1 to 4. The photoelectric conversion device may be, for example, a solid-state imaging device, a focus detection device, a distance measuring device, a time-of-flight (TOF) camera, or the like.

FIG. 1 is a block diagram illustrating a schematic configuration of a photoelectric conversion device 1 according to the present embodiment. As illustrated in FIG. 1, the photoelectric conversion device 1 includes a pixel array 10, a vertical selection circuit 12, a signal processing circuit 14, a horizontal selection circuit 13, an output circuit 16, and a control circuit 17.

The pixel array 10 includes a plurality of pixels 11 arranged in a matrix over a plurality of rows and a plurality of columns. In FIG. 1, a plurality of pixels 11 arranged in the first to m-th rows and the first to n-th columns are illustrated together with reference numerals each indicating a row number and a column number. For example, a pixel 11 arranged in the second row and the first column is denoted by a reference numeral "P21".

The number of rows and columns of the pixel array 10 is not particularly limited. In addition, the pixels 11 need not necessarily be two-dimensionally arranged in the pixel array 10. For example, the pixel array 10 may be composed of one pixel 11, or the pixels 11 may be arranged one-dimensionally in the row direction or the column direction in the pixel array 10.

In each row of the pixel array 10, control lines PVSEL are arranged extending in a first direction (lateral direction in FIG. 1). The control line PVSEL is connected to the pixels 11 arranged in the first direction, and serve as a signal line common to the pixels 11. In FIG. 1, a control line PVSEL is illustrated together with a reference numeral indicating a row number. For example, the control line of the first row is denoted by a reference numeral "PVSEL[1]".

The control line PVSEL of each row is connected to the vertical selection circuit 12. The vertical selection circuit 12 is a circuit unit that supplies control signals for driving the signal generation circuit in the pixel 11 to the pixel 11 through the control line PVSEL.

In each column of the pixel array 10, a signal line 15 is arranged to extend in a second direction (vertical direction in FIG. 1) intersecting with the first direction. The signal line 15 is connected to each of the pixels 11 arranged in the second direction, and serves as a signal line common to the pixels 11.

The signal line 15 is connected to the signal processing circuit 14. The signal processing circuit 14 is provided with signal processing blocks provided for respective columns of the pixel array 10, and each signal processing block is connected to a signal line 15 of a corresponding column. The signal processing circuit 14 has a function of holding a signal output from the pixel 11 through the signal line 15 of the corresponding column.

The horizontal selection circuit 13 is a circuit unit that supplies a control signal for reading out a signal from the signal processing circuit 14 to the signal processing circuit 14. The horizontal selection circuit 13 supplies a control signal to a signal processing block of each column of the signal processing circuit 14 via a control line PHSEL. The signal processing block that has received the control signal from the horizontal selection circuit 13 outputs the signal held in the holding unit to the output circuit 16. In FIG. 1, a control line PHSEL is illustrated together with a reference numeral indicating a column number. For example, a control line in the first column is denoted by a reference numeral "PHSEL[1]".

The output circuit 16 outputs the supplied signal to the outside of the photoelectric conversion device 1. The control circuit 17 is a circuit unit for supplying control signals for controlling operations and operation timings of the vertical selection circuit 12, the signal processing circuit 14, the horizontal selection circuit 13, and the output circuit 16. At least a part of the control signals for controlling the operations and operation timings of the vertical selection circuit 12, the signal processing circuit 14, the horizontal selection circuit 13, and the output circuit 16 may be supplied from the outside of the photoelectric conversion device 1.

Figure 2:
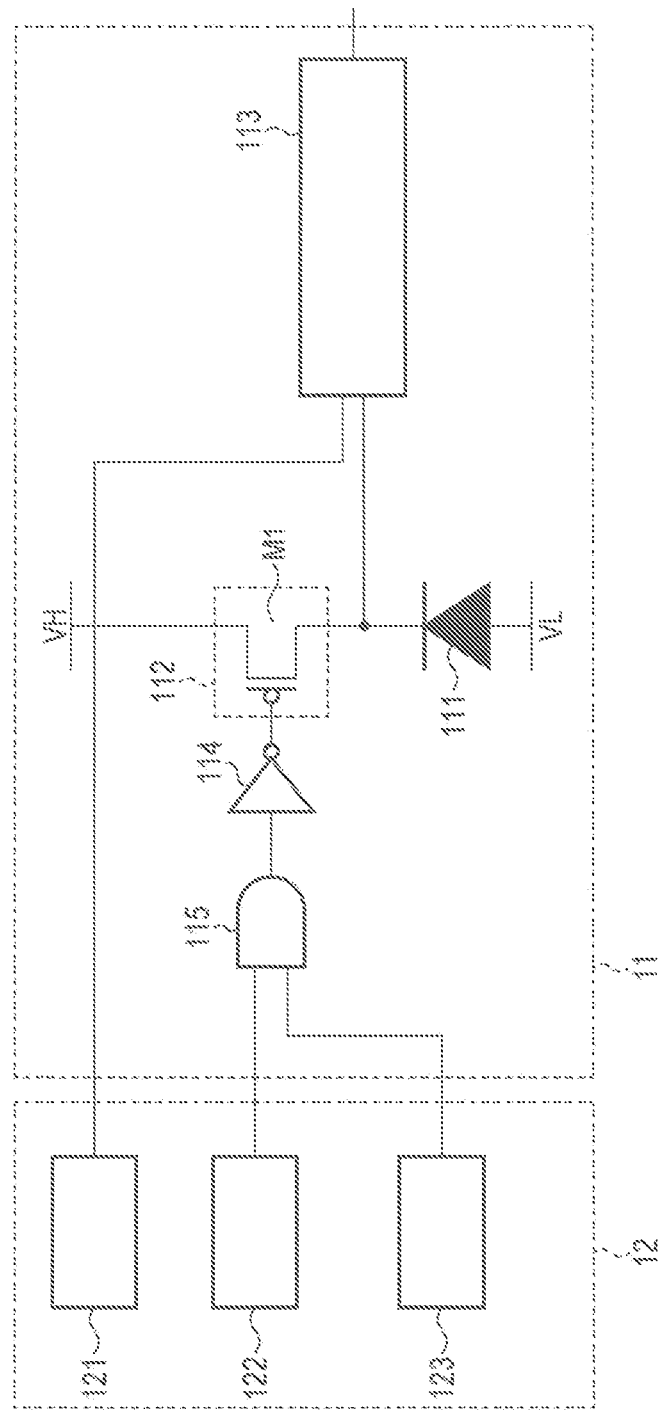
FIG. 2 is a circuit diagram illustrating a schematic configuration of a pixel according to the first embodiment.

FIG. 2 is a circuit diagram illustrating a schematic configuration of the pixel 11 according to the present embodiment. FIG. 2 illustrates one pixel 11 and a plurality of functional blocks supplying control signals to the pixel 11 in the vertical selection circuit 12.

The pixel 11 includes a photodiode 111, a recharging circuit 112, a pixel signal processing circuit 113, a NOT circuit 114, and an AND circuit 115. The vertical selection circuit 12 includes a counter enabling circuit 121, a clock generation circuit 122, and a recharge enabling circuit 123. The recharging circuit 112 includes a PMOS transistor M1.

The photodiode 111 is a photoelectric conversion unit that generates a charge pair corresponding to incident light by photoelectric conversion. The photodiode 111 is configured to operate as an avalanche photodiode that performs avalanche multiplication. A voltage VL is supplied to the anode of the photodiode 111. The cathode of the photodiode 111 is connected to the drain of the PMOS transistor M1 and the pixel signal processing circuit 113. A voltage VH is supplied to the source of the PMOS transistor M1. The voltage VL is, for example, about −20 V, and the voltage VH is, for example, about 3.3 V.

The counter enabling circuit 121 is connected to the pixel signal processing circuit 113. The counter enabling circuit 121 outputs a control signal to the pixel signal processing circuit 113, thereby controlling a period during which the counter in the pixel signal processing circuit 113 is enabled. The pixel signal processing circuit 113 counts the number of times the avalanche multiplication occurs, and outputs a digital signal corresponding to the count value to the outside. The clock generation circuit 122 is connected to a first input terminal of the AND circuit 115 (first logic circuit), and the recharge enabling circuit 123 is connected to a second input terminal of the AND circuit 115. The clock generation circuit 122 outputs a clock pulse including pulses periodically repeating transitions from the low level (first level) to the high level (second level) as a control signal. The recharge enabling circuit 123 outputs a control signal for controlling enabling of the recharging operation in the recharging circuit 112. The output terminal of the AND circuit 115 is connected to the input terminal of the NOT circuit 114. The output terminal of the NOT circuit 114 is connected to the gate of the PMOS transistor M1.

When the PMOS transistor M1 is turned on based on the logical conjunction of the output signal of the clock generation circuit 122 and the output signal of the recharge enabling circuit 123, a reverse bias voltage based on the voltage VH and the voltage VL is applied to the photodiode 111. When a charge is generated by incident light in the photodiode 111 to which the reverse bias voltage is applied, the charge causes avalanche multiplication, and an avalanche current is generated. The reverse bias voltage is set to a voltage higher than the breakdown voltage of the photodiode 111, and the photodiode 111 operates as an avalanche photodiode of a Geiger mode.

Figure 3:
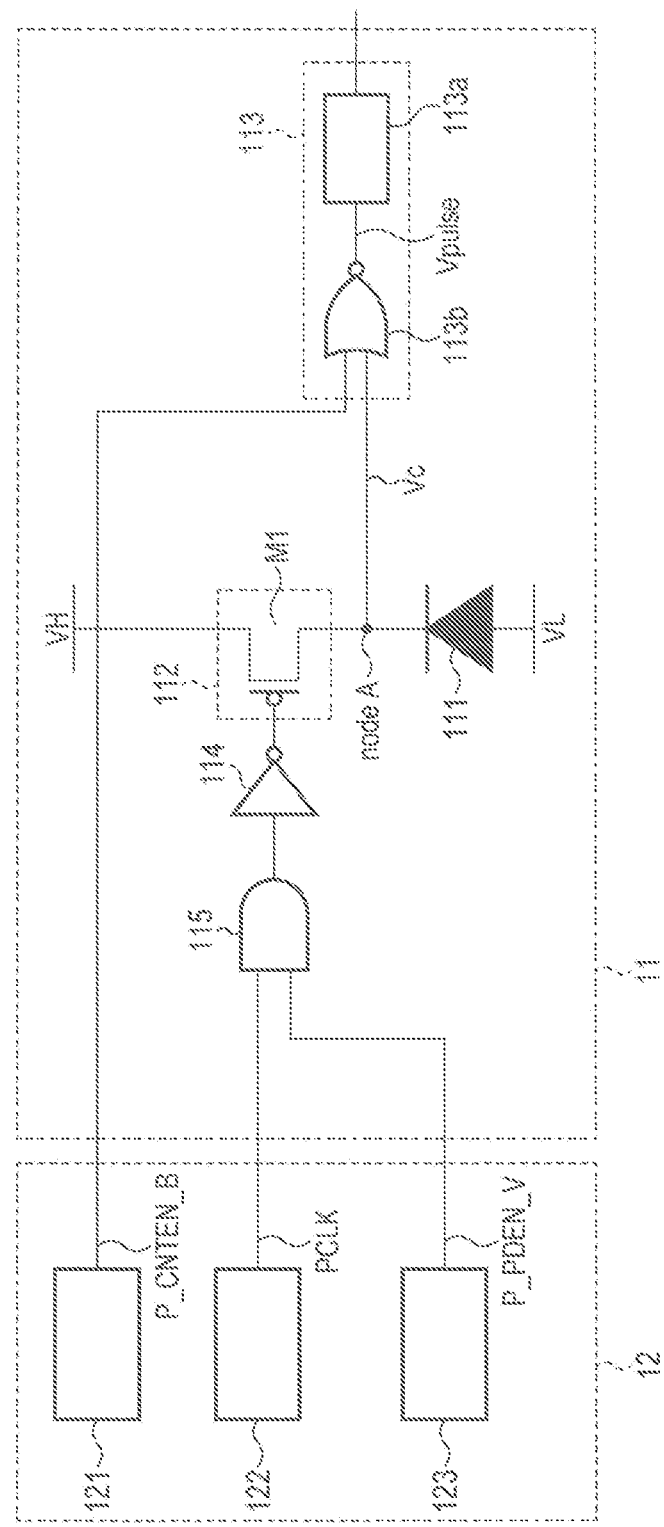
FIG. 3 is a diagram illustrating a configuration example of the pixel according to the first embodiment.

FIG. 3 is a diagram illustrating a configuration example of the pixel 11 according to the present embodiment. FIG. 3 illustrates the configuration of the pixel signal processing circuit 113 illustrated in FIG. 2 in more detail. The pixel signal processing circuit 113 includes a counter 113a and a NOR circuit 113b. The counter enabling circuit 121, the clock generation circuit 122, and the recharge enabling circuit 123 output a control signal P_CNTEN_B (second control signal), a control signal PCLK (first control signal), and a control signal P_PDEN_V (third control signal), respectively. The control signal PCLK and the control signal P_PDEN_V are input to the AND circuit 115, and the output signal of the AND circuit 115 is input to the NOT circuit 114. The AND circuit 115 and the NOT circuit 114 output a signal obtained by inverting the logical conjunction of those, and control the PMOS transistor M1 of the recharging circuit 112. Further, as illustrated in FIG. 3, a connection node between the cathode of the photodiode 111 and the drain of the PMOS transistor M1 is referred to as node A. A signal output from the node A, that is, a signal output from the photodiode 111 is referred to as a signal Vc.

The counter enabling circuit 121 is connected to a first input terminal of the NOR circuit 113b (second logic circuit), and the node A is connected to a second input terminal of the NOR circuit 113b. An output terminal of the NOR circuit 113b is connected to the counter 113a. That is, the NOR circuit 113b outputs a signal Vpulse obtained by inverting the logical disjunction of the signal Vc and the control signal P_CNTEN_B to the counter 113a. The signal Vpulse is a signal having a pulse waveform.

The counter 113a counts the number of times the signal Vpulse output from the NOR circuit 113b transitions from the low level to the high level. Thus, the counter 113a generates a count signal having a count value corresponding to the incidence of photons on the photodiode 111.

Figure 4:
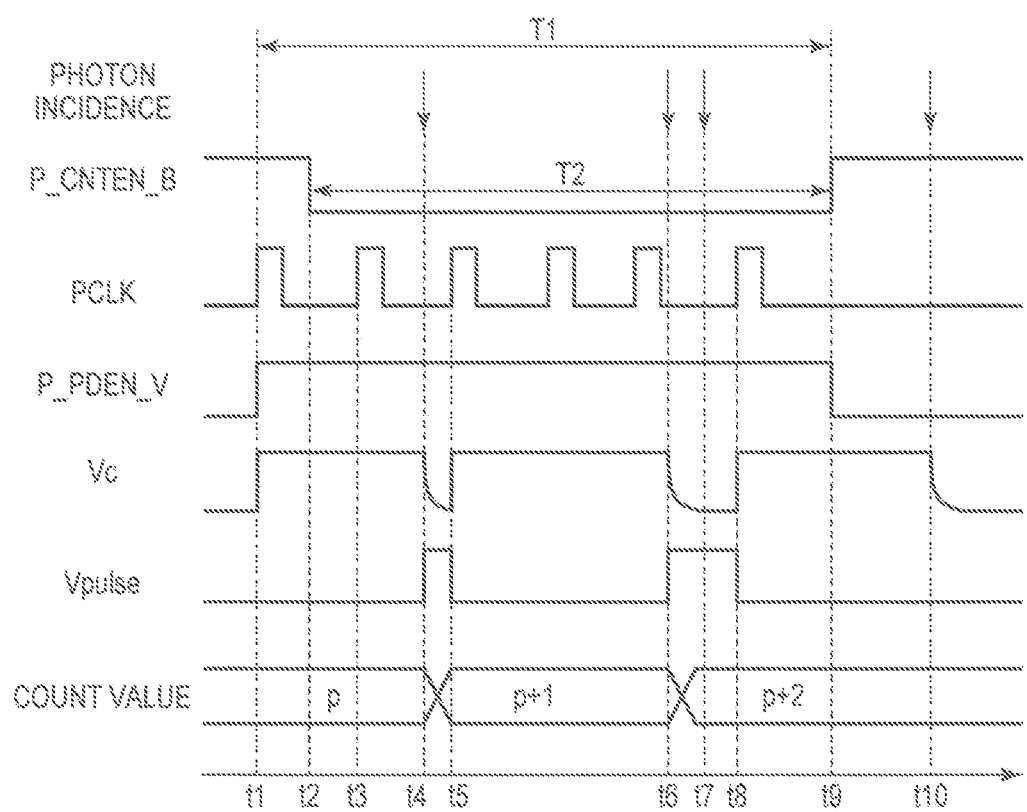
FIG. 4 is a timing chart illustrating an operation of the pixel according to the first embodiment.

FIG. 4 is a timing chart illustrating an operation of the pixel 11 according to the present embodiment. "P_CNTEN_B", "PCLK", "P_PDEN_V", "Vc", and "Vpulse" illustrated in FIG. 4 indicate potentials of respective signals illustrated in FIG. 3. In "PHOTON INCIDENCE" of FIG. 4, timings at which photons enter the photodiode 111 is indicated by arrows. "COUNT VALUE" in FIG. 4 indicates the count value held in the counter 113a at the corresponding time.

In a period before time t1, the control signal P_CNTEN_B is at the high level, and the control signal PCLK, the control signal P_PDEN_V, the signal Vc, and the signal Vpulse are at the low level. The count value is p. In this period, since the control signal P_PDEN_V is at the low level, the output of the AND circuit 115 is at the low level. The output of the NOT circuit 114, that is, the potential of the gate of the PMOS transistor M1 is at the high level. Accordingly, the PMOS transistor M1 is off, and the node A between the recharging circuit 112 and the photodiode 111 is in a floating state. Thus, the period in which the control signal P_PDEN_V is at the low level is a period in which the recharging operation of the photodiode 111 is disabled.

In this period, since the control signal P_CNTEN_B is at the high level, the output of the NOR circuit 113b, that is, the signal Vpulse, is at the low level regardless of the level of the signal Vc. Accordingly, the count in the counter 113a is disabled.

At the time t1, the control signal PCLK and the control signal P_PDEN_V change from the low level to the high level. Thereby, the output of the AND circuit 115 becomes the high level, and the output of the NOT circuit 114 becomes the low level. At this time, the PMOS transistor M1 is turned on, and the recharging operation of the photodiode 111 is performed. By this recharging operation, the signal Vc becomes the high level, and the photodiode 111 enters a standby state in which avalanche multiplication can be performed. Thus, the period in which the control signal P_PDEN_V is at the high level is a period in which the recharging operation of the photodiode 111 is enabled. Photons incident on the photodiode 111 during the period in which the recharging operation is enabled can be subject to counting. Accordingly, the time t1 is the start time of a photon count period T1.

At time t2, the control signal P_CNTEN_B becomes the low level. The period in which the control signal P_CNTEN_B is at the low level is a period in which the count operation by the counter 113a is enabled. Accordingly, the time t2 is the start time of a count enabled period T2.

At time t3, the control signal PCLK changes from the low level to the high level. Thereby, the potential of the control signal PCLK exceeds the logic threshold value of the AND circuit 115, and the output of the AND circuit 115 becomes the high level. Then, the output of the NOT circuit 114 becomes the low level, and the PMOS transistor M1 turns on. However, since the signal Vc is at the high level before the time t3, the level of the signal Vc does not change.

At time t4, a photon enters the photodiode 111. As a result, avalanche multiplication occurs in the photodiode 111, and the signal Vc transitions from the high level to the low level. Then, the potential of the signal Vc becomes lower than the logic threshold value of the NOR circuit 113b, and the signal Vpulse transitions from the low level to the high level. By the change in the potential of the signal Vpulse, the count value of the count signal output from the counter 113a increases by one least significant bit (LSB). That is, the count value changes from p to p+1.

At time t5, the control signal PCLK changes from the low level to the high level. Thereby, the potential of the control signal PCLK exceeds the logic threshold value of the AND circuit 115, and the output of the AND circuit 115 becomes the high level. Then, the output of the NOT circuit 114 becomes the low level, and the PMOS transistor M1 turns on. At this time, the recharging operation of the photodiode 111 is performed. That is, the signal Vc changes from the low level to the high level, and the photodiode 111 enters the standby state in which avalanche multiplication can be performed. In conjunction with the transition of the signal Vc from the low level to the high level, the signal Vpulse output from the NOR circuit 113b also transitions from the high level to the low level.

At time t6, a photon enters the photodiode 111. As a result, avalanche multiplication occurs in the photodiode 111, and the signal Vc transitions from the high level to the low level. Then, the potential of the signal Vc becomes lower than the logic threshold value of the NOR circuit 113b, and the signal Vpulse transitions from the low level to the high level. By the change in the potential of the signal Vpulse, the count value of the count signal output from the counter 113a increases by one LSB. That is, the count value changes from p+1 to p+2.

At time t7, a photon enters the photodiode 111. However, at the time t7, the signal Vc is at the low level, and the signal Vpulse, which is the output of the NOR circuit 113b, remains at the high level and does not change, so that the count value does not increase.

At time t8, the control signal PCLK changes from the low level to the high level. Thereby, the potential of the control signal PCLK exceeds the logic threshold value of the AND circuit 115, and the output of the AND circuit 115 becomes the high level. Then, the output of the NOT circuit 114 becomes the low level, and the PMOS transistor M1 turns on. At this time, the photodiode 111 is recharged, the signal Vc changes from the low level to the high level, and the photodiode 111 enters the standby state capable of performing avalanche multiplication. In conjunction with the transition of the signal Vc from the low level to the high level, the signal Vpulse output from the NOR circuit 113b also transitions from the high level to the low level.

At time t9, the control signal P_CNTEN_B becomes the high level, and the control signal P_PDEN_V becomes the low level. After the time t9, the level of the control signal PCLK is maintained at the low level. When the control signal P_CNTEN_B becomes the high level, the counter 113a cancels the enabling of the count operation. Accordingly, the time t9 is the end time of the count enabled period T2. When the control signal P_PDEN_V becomes the low level, the recharging operation of the photodiode 111 is disabled. Therefore, the time t9 is the end time of the photon count period T1.

At time t10, a photon enters the photodiode 111. As a result, avalanche multiplication occurs in the photodiode 111, and the signal Vc transitions from the high level to the low level. Then, the potential of the signal Vc becomes lower than the logic threshold of the NOR circuit 113b. However, since the control signal P_CNTEN_B is at the high level and the signal Vpulse output from the NOR circuit 113b does not change, the count value does not increase.

As described above, in the present embodiment, the photon count period T1 in which the recharge operation of the photodiode 111 is enabled is started at the time t1 before the time t2 at which the count enabled period T2 in which the counter 113a is enabled is started. That is, before the counter 113a is enabled based on the control signal P_CNTEN_B, the control signal PCLK transitions from the low level to the high level and transitions from the high level to the low level. Effects obtained by applying such a driving method will be described.

In the driving method in which the count enabled period T2 can be started before the start of the photon count period T1, the count may be started before the recharging operation. When counting is started before the recharging operation, the state of the photodiode 111 before the recharging operation may affect the count value. For example, in a case where the photodiode 111 is already in a state after the avalanche multiplication (that is, the signal Vc is at the low level) at the start of the count enabled period T2, the count value increases by one at the start of the count enabled period T2. In this case, since the count value is counted more than the number of actual incident photons by one, an error may occur in the count value.

Even if the photoelectric conversion device is designed such that the start of the photon count period T1 and the start of the count enabled period T2 are simultaneous, there may be a case where the start of the photon count period T1 and the start of the count enabled period T2 are not simultaneous in an actual product due to an error in timings of control signals or the like. In such a case, an error in the count value may occur due to the above-described factors. As the factors that cause an error in the timings of the control signals as described above, there are, for example, a large number of pixels 11 in the pixel array 10, a variation in characteristics of elements in the pixels 11, and a difference in positions of the pixels 11 in the pixel array.

On the other hand, the photoelectric conversion device 1 of the present embodiment is configured such that the photon count period T1 for enabling the recharging operation is started at the time t1 before the time t2 at which the count enabled period T2 starts. This reduces the error in the number of counts caused by counting before the recharging operation. Therefore, according to the present embodiment, the photoelectric conversion device 1 capable of further improving the accuracy of signal acquisition is provided.

In the configuration illustrated in FIG. 3, the control signal PCLK and the control signal P_PDEN_V are processed by the AND circuit 115 and the NOT circuit 114 arranged in the pixel 11, so that a signal supplied to the recharging circuit 112 is generated. However, the present embodiment is not limited thereto. For example, similar processing may be performed in the vertical selection circuit 12.

Further, FIG. 4 illustrates an example in which the potential of the control signal PCLK does not change outside the photon count period T1, but the control signal PCLK may repeat the high level and the low level outside the photon count period T1 as in the photon count period T1.

Second Embodiment

A photoelectric conversion device and a driving method thereof according to the present embodiment will be described with reference to FIGS. 5 and 6. A description of a configuration common to that of the first embodiment may be omitted or simplified.

Figure 5:
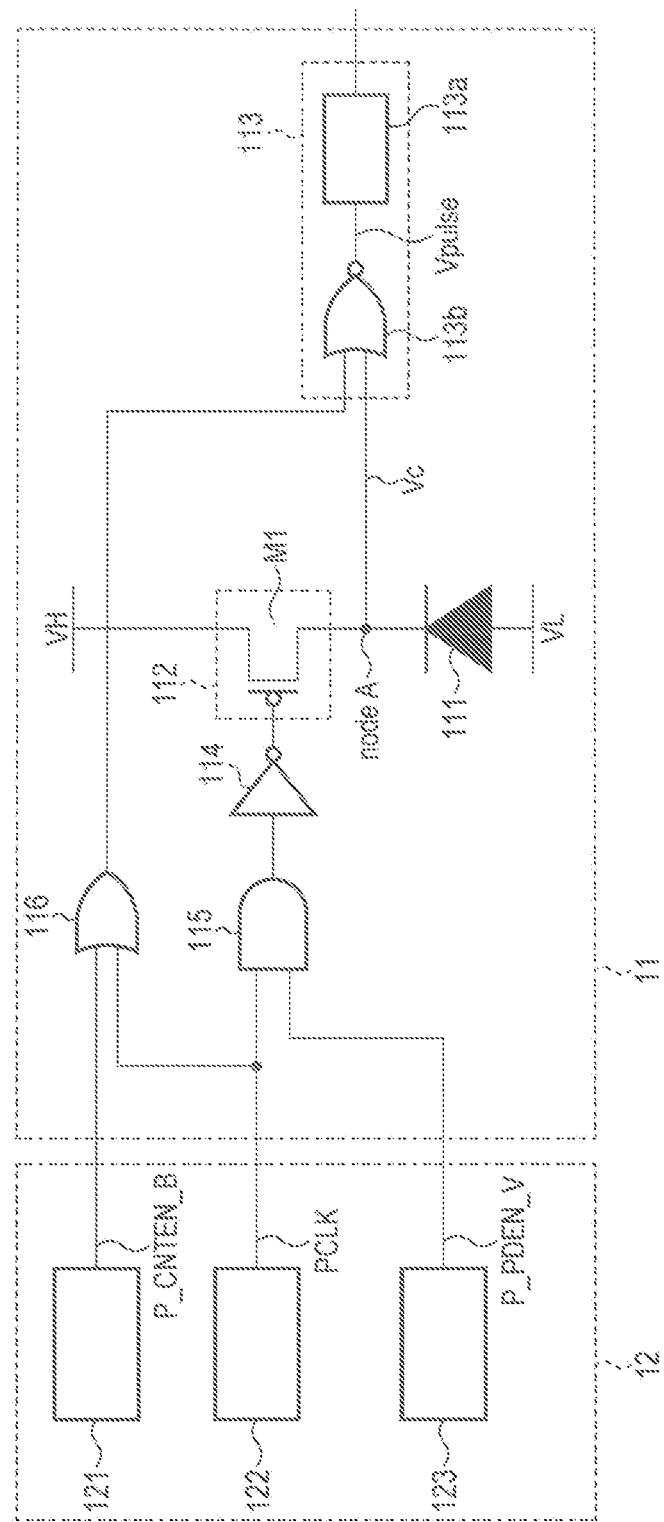
FIG. 5 is a diagram illustrating a configuration example of a pixel according to a second embodiment.

FIG. 5 is a diagram illustrating a configuration example of a pixel 11 according to the present embodiment. FIG. 5 is different from FIG. 3 in that an OR circuit 116 (third logic circuit) is further arranged. The counter enabling circuit 121 is connected to a first input terminal of the OR circuit 116, and the clock generation circuit 122 is connected to a second input terminal of the OR circuit 116. An output terminal of the OR circuit 116 is connected to a first input terminal of the NOR circuit 113b. That is, the control signal P_CNTEN_B and the control signal PCLK are input to the OR circuit 116, and the OR circuit 116 outputs a logical disjunction (fourth control signal) of these signals to the NOR circuit 113b. Thus, in the present embodiment, when the control signal PCLK is at the high level, the signal Vpulse is at the low level regardless of the potential of the signal Vc.

Figure 6:
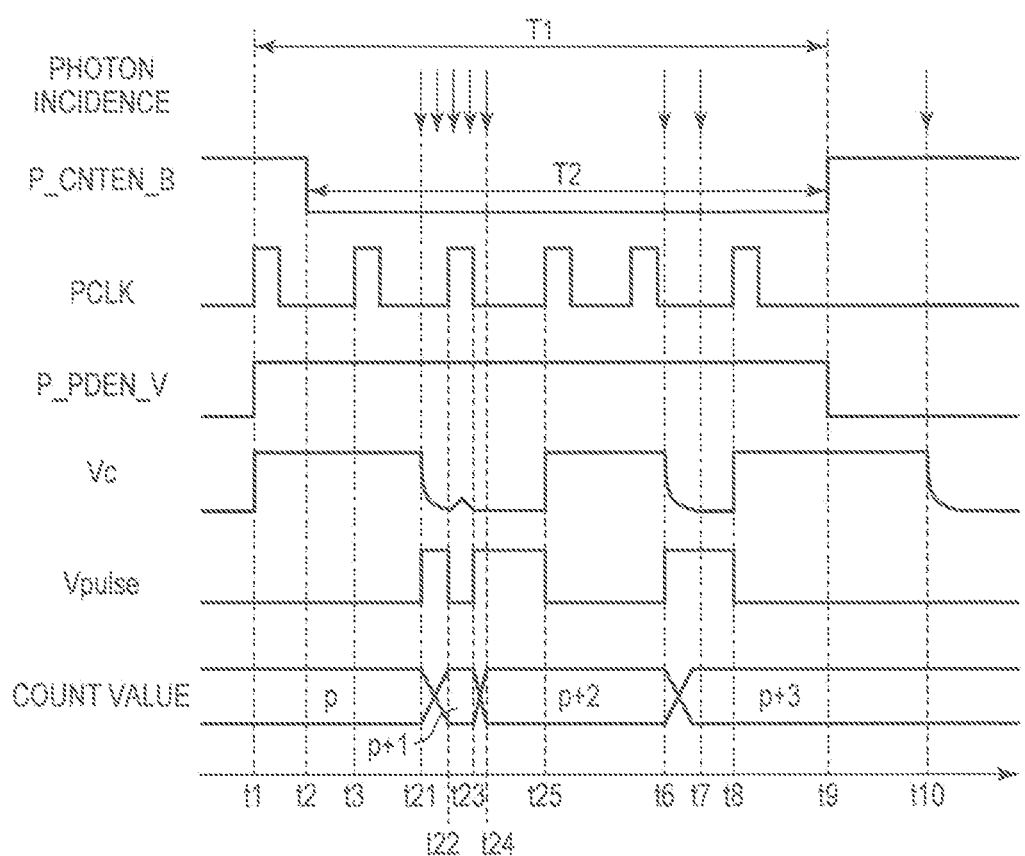
FIG. 6 is a timing chart illustrating an operation of the pixel according to the second embodiment.

FIG. 6 is a timing chart illustrating an operation of the pixel 11 according to the present embodiment. Since the operation from the time t1 to the time t3 and the operation from the time t6 to the time t10 are the same as those in FIG. 4, the description thereof will be omitted. FIG. 6 is different from FIG. 4 in that a plurality of photons is continuously incident on the photodiode 111 from time t21 to time t24.

At the time t21, a photon enters the photodiode 111. As a result, avalanche multiplication occurs in the photodiode 111, and the signal Vc transitions from the high level to the low level. Then, the potential of the signal Vc becomes lower than the logic threshold value of the NOR circuit 113b, and the signal Vpulse transitions from the low level to the high level. By the change in the potential of the signal Vpulse, the count value of the count signal output from the counter 113a increases by one LSB. That is, the count value changes from p to p+1.

At time t22, the control signal PCLK changes from the low level to the high level. Thereby, the PMOS transistor M1 is turned on. However, since a plurality of photons is continuously incident on the photodiode 111 from the time t21 to the time t24, avalanche multiplication continues to occur in the photodiode 111. Therefore, since the recharging operation is not sufficiently performed and the signal Vc does not rise from the low level to the high level, the signal Vc remains at the low level. Thus, the signal Vc input to the second input terminal of the NOR circuit 113b remains at the low level. However, since the output signal of the OR circuit 116 is at the high level and the high-level signal is input to the first input terminal of the NOR circuit 113b, the signal Vpulse transitions from the high level to the low level at the time t22.

At time t23, the control signal PCLK changes from the high level to the low level. At this time, the output signal of the OR circuit 116 transitions from the high level to the low level, and becomes lower than the logic threshold of the NOR circuit 113b. Thereby, the signal Vpulse transitions from the low level to the high level. By the change in the potential of the signal Vpulse, the count value of the count signal output from the counter 113a increases by one LSB. That is, the count value changes from p+1 to p+2.

At the time t24, a photon enters the photodiode 111. However, at the time t24, the signal Vc is at the low level, and the signal Vpulse, which is the output of the NOR circuit 113b, remains at the high level and does not change, so that the count value does not increase.

At time t25, the control signal PCLK changes from the low level to the high level. Thereby, the potential of the control signal PCLK exceeds the logic threshold value of the AND circuit 115, and the output of the AND circuit 115 becomes the high level. Then, the output of the NOT circuit 114 becomes the low level, and the PMOS transistor M1 turns on. At this time, the photodiode 111 is recharged, the signal Vc changes from the low level to the high level, and the photodiode 111 enters the standby state capable of performing avalanche multiplication. Since the subsequent operation is the same as that in FIG. 4, the description thereof will be omitted.

According to the present embodiment, similarly to the first embodiment, the photoelectric conversion device 1 capable of further improving the accuracy of signal acquisition is provided. Further, in the present embodiment, even when photons continuously enter the photodiode 111, avalanche multiplication continues to occur, and the recharging operation is not sufficiently performed, such as the time t21 to the time t24, a part of the photons can be counted. Therefore, the accuracy of signal acquisition may be improved.

Third Embodiment

A photoelectric conversion device and a driving method thereof according to the present embodiment will be described with reference to FIGS. 7 and 8. A description of a configuration common to the first embodiment or the second embodiment may be omitted or simplified.

Figure 7:
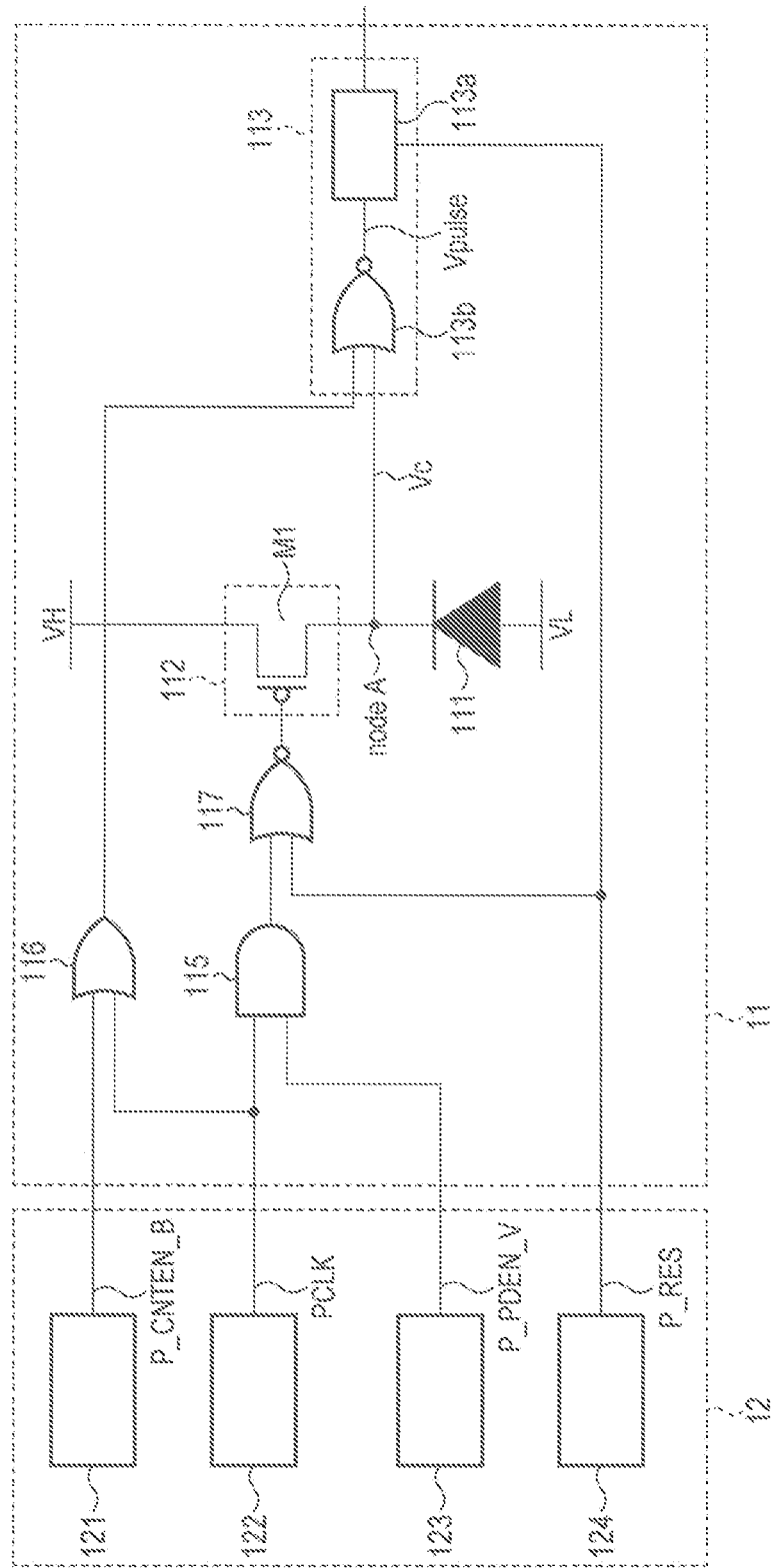
FIG. 7 is a diagram illustrating a configuration example of a pixel according to a third embodiment.

FIG. 7 is a diagram illustrating a configuration example of a pixel 11 according to the present embodiment. FIG. 7 is different from FIG. 5 in that the NOT circuit 114 is replaced with a NOR circuit 117 (fourth logic circuit) and that a reset circuit 124 is arranged in the vertical selection circuit 12. A first input terminal of the NOR circuit 117 is connected to an output terminal of the AND circuit 115. The reset circuit 124 is connected to a second input terminal of the NOR circuit 117 and the counter 113a. An output terminal of the NOR circuit 117 is connected to the gate of the PMOS transistor M1. The reset circuit 124 outputs a control signal P_RES (fifth control signal). When the high-level control signal P_RES is input to the counter 113a, the count value held in the counter 113a is reset to zero, which is an initial value.

Figure 8:
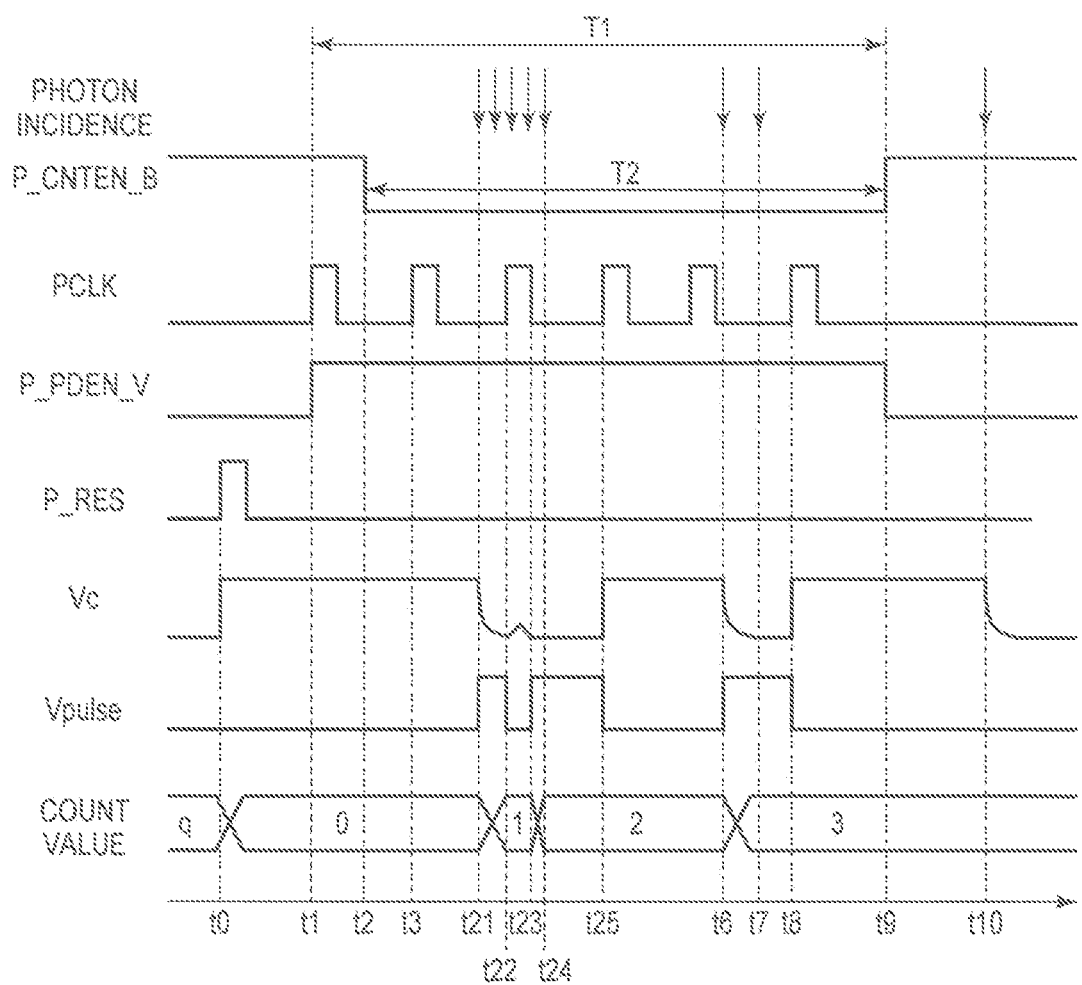
FIG. 8 is a timing chart illustrating an operation of the pixel according to the third embodiment.

FIG. 8 is a timing chart illustrating an operation of the pixel 11 according to the present embodiment. Since the operation after the time t2 is the same as that in FIG. 6, the description thereof will be omitted. FIG. 8 is different from FIG. 6 in that the counter 113a is reset at time t0 before the time t1.

In a period before the time t0, the control signal P_CN-TEN_B is at the high level, and the control signal PCLK, the control signal P_PDEN_V, the control signal P_RES, the signal Vc, and the signal Vpulse are at the low level. The count value is q.

At the time t0, the control signal P_RES becomes the high level. As a result, the output of the NOR circuit 117 becomes the low level, and the PMOS transistor M1 turns on. At this time, the photodiode 111 is recharged, the signal Vc changes from the low level to the high level, and the photodiode 111 enters the standby state capable of performing avalanche multiplication. Further, the counter 113a is reset, and the count value changes from q to zero.

At time t1, the control signal PCLK and the control signal P_PDEN_V change from the low level to the high level. Thereby, the PMOS transistor M1 is turned on. However, since the signal Vc is at the high level before the time t1, the level of the signal Vc does not change. The subsequent operations are the same as those in FIG. 6, and thus description thereof will be omitted.

According to the present embodiment, similarly to the first embodiment and the second embodiment, the photoelectric conversion device 1 capable of further improving the accuracy of signal acquisition is provided. Further, in the present embodiment, the recharging operation of the photodiode 111 can be performed even when the counter 113a is reset.

In FIG. 8, the timing at which the control signal PCLK and the control signal P_PDEN_V change from the low level to the high level at time t1 is the start time of the photon count period T1. However, the start time of the photon count period T1 is not limited thereto. The last recharging operation before the time t2 at which the control signal P_CN-TEN_B changes from the high level to the low level may be performed by the control signal P_RES changing from the low level to the high level. In this case, the timing at which the control signal P_RES changes from the low level to the high level may be the start time of the photon count period T1.

Further, the timing at which the control signal PCLK and the control signal P_PDEN_V change from the low level to the high level may be the same as the timing at which the control signal P_RES changes from the low level to the high level.

Fourth Embodiment

Based on the configuration of the third embodiment, a more preferable example of the period of the control signal PCLK, the timing of the recharging operation, the timing of the enabling of the counter 113a, and the like will be described with reference to FIG. 9 as a fourth embodiment. Since the configuration of the pixel 11, operation timing of the pixel 11, and the like are similar to those of the third embodiment, description thereof will be omitted.

Figure 9:
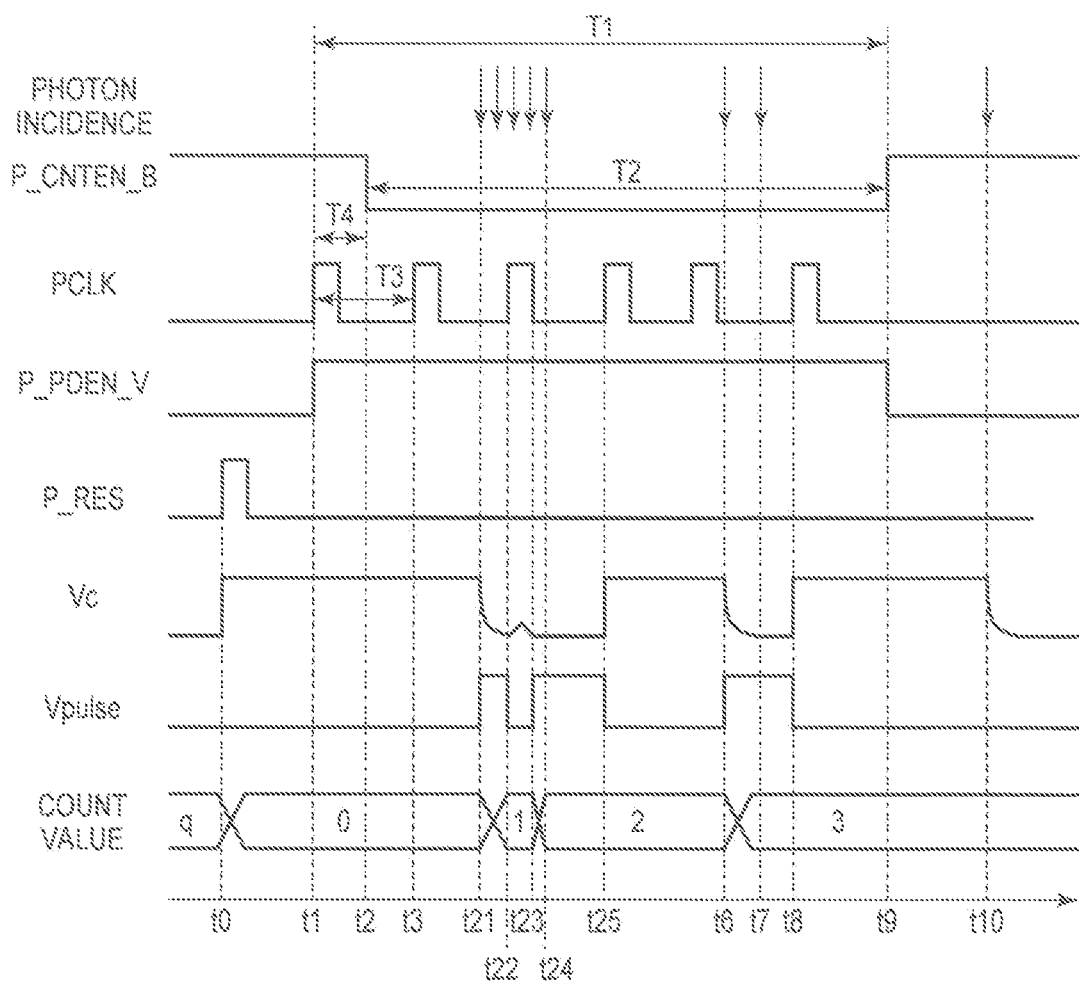
FIG. 9 is a timing chart illustrating an operation of the pixel according to a fourth embodiment.

FIG. 9 is a timing chart illustrating the operation of the pixel 11 according to the present embodiment. Although the operation at each time is similar to that of FIG. 8, a period T3 from the time t1 to the time t3 and a period T4 from the time t1 to the time t2 are illustrated in FIG. 9. The period T3 corresponds to the period of the pulses of the control signal PCLK. The period T4 corresponds to a period from the timing at which, before the start of the count enabled period, the PMOS transistor M1 is turned on last to the start of the count enabled period T2. Since the operation at each time is the same as that in FIG. 8, description thereof will be omitted.

As illustrated in FIG. 9, the length of the period T4 is desirably equal to or less than the length of the period T3, that is, equal to or less than the period of the pulses of the control signal PCLK. In the case where the length of the period T4 is longer than the length of the period T3, the number of the control signals PCLK in the count enabled period T2 decreases, and the count loss of photons may occur. Therefore, by setting the length of the period T4 to be equal to or less than the length of the period T3, the number of the control signals PCLK in the count enabled period T2 can be maintained, and the count loss of photons can be reduced.

According to the present embodiment, similarly to the first to third embodiments, the photoelectric conversion device 1 capable of further improving the accuracy of signal acquisition is provided. Further, in the present embodiment, the count loss of photons can be reduced.

FIG. 9 illustrates an example in which the recharging operation immediately before the count enabled period T2 is performed by the control signal PCLK transitioning to the high level. However, as described with reference to FIG. 8, the recharging operation immediately before the count enabled period T2 may be performed when the control signal P_RES becomes the high level.

Fifth Embodiment

Figure 10:
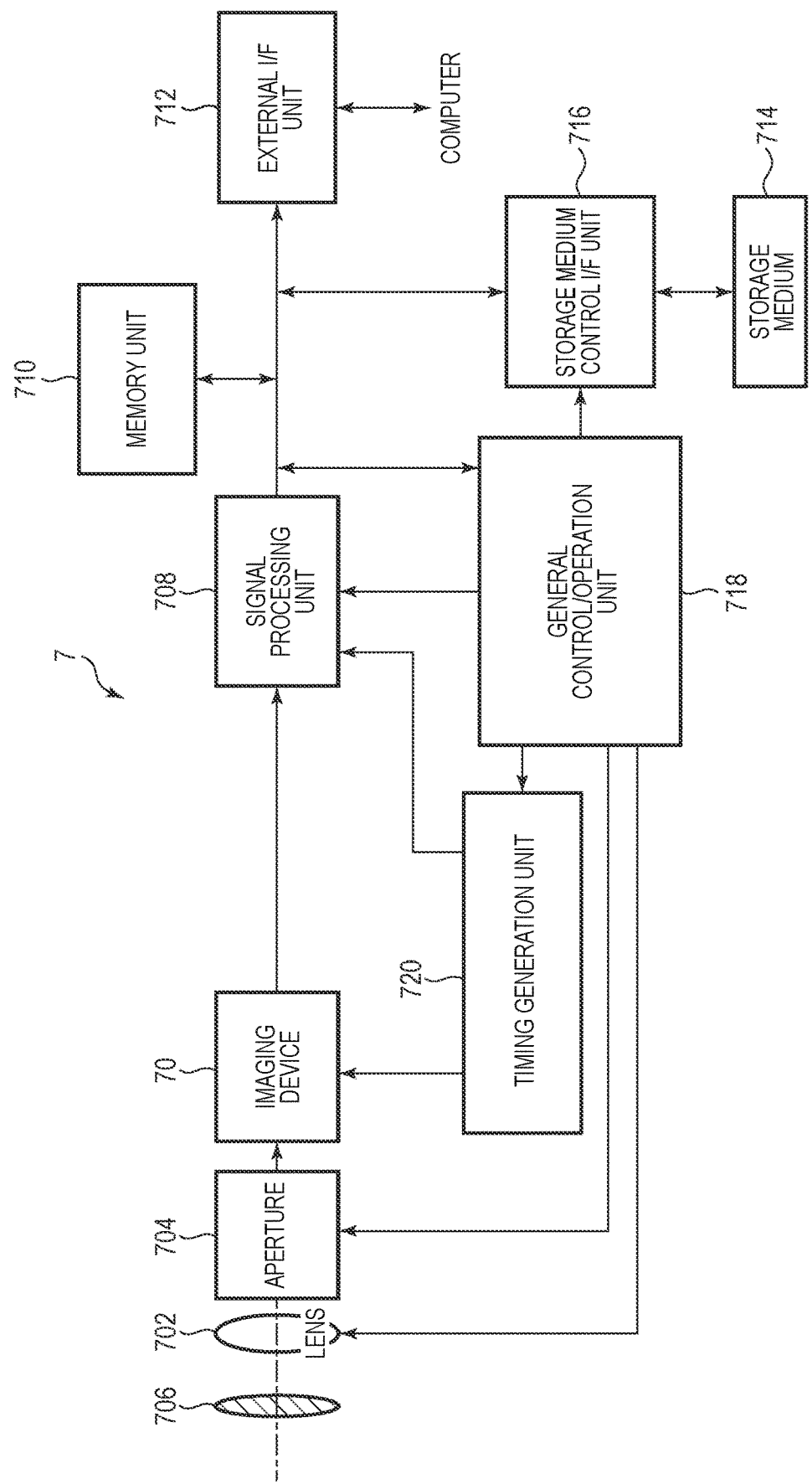
FIG. 10 is a block diagram of a light detection system according to a fifth embodiment.

A light detection system according to a fifth embodiment of the present disclosure will be described with reference to FIG. 10. FIG. 10 is a block diagram of a light detection system according to the present embodiment. The light detection system of the present embodiment is an imaging system that acquires an image based on incident light.

The photoelectric conversion device of the above-described embodiment may be applied to various imaging systems. Examples of the imaging system include a digital still camera, a digital camcorder, a camera head, a copying machine, a facsimile, a mobile phone, a vehicle-mounted camera, an observation satellite, and a surveillance camera. FIG. 10 is a block diagram of a digital still camera as an example of an imaging system.

The imaging system 7 illustrated in FIG. 10 includes a barrier 706, a lens 702, an aperture 704, an imaging device 70, a signal processing unit 708, a timing generation unit 720, a general control/operation unit 718, a memory unit 710, a storage medium control I/F unit 716, a storage medium 714, and an external I/F unit 712. The barrier 706 protects the lens, and the lens 702 forms an optical image of an object on the imaging device 70. The aperture 704 varies an amount of light passing through the lens 702. The imaging device 70 is configured as in the photoelectric conversion device of the above-described embodiment, and converts an optical image formed by the lens 702 into image data. The signal processing unit 708 performs various kinds of correction, data compression, and the like on the imaging data output from the imaging device 70.

The timing generation unit 720 outputs various timing signals to the imaging device 70 and the signal processing unit 708. The general control/operation unit 718 controls the entire digital still camera, and the memory unit 710 temporarily stores image data. The storage medium control I/F unit 716 is an interface for storing or reading out image data on the storage medium 714, and the storage medium 714 is a detachable storage medium such as a semiconductor memory for storing or reading out image data. The external I/F unit 712 is an interface for communicating with an external computer or the like. The timing signal or the like may be input from the outside of the imaging system 7, and the imaging system 7 may include at least the imaging device 70 and the signal processing unit 708 that processes an image signal output from the imaging device 70.

In the present embodiment, the imaging device 70 and the signal processing unit 708 may be formed in the same semiconductor substrate. Further, the imaging device 70 and the signal processing unit 708 may be arranged in different semiconductor substrates.

Further, each pixel of the imaging device 70 may include a first photoelectric conversion unit and a second photoelectric conversion unit. The signal processing unit 708 processes a pixel signal based on a charge generated in the first photoelectric conversion unit and a pixel signal based on a charge generated in the second photoelectric conversion unit, and acquires the distance information from the imaging device 70 to the object.

Sixth Embodiment

Figure 11:
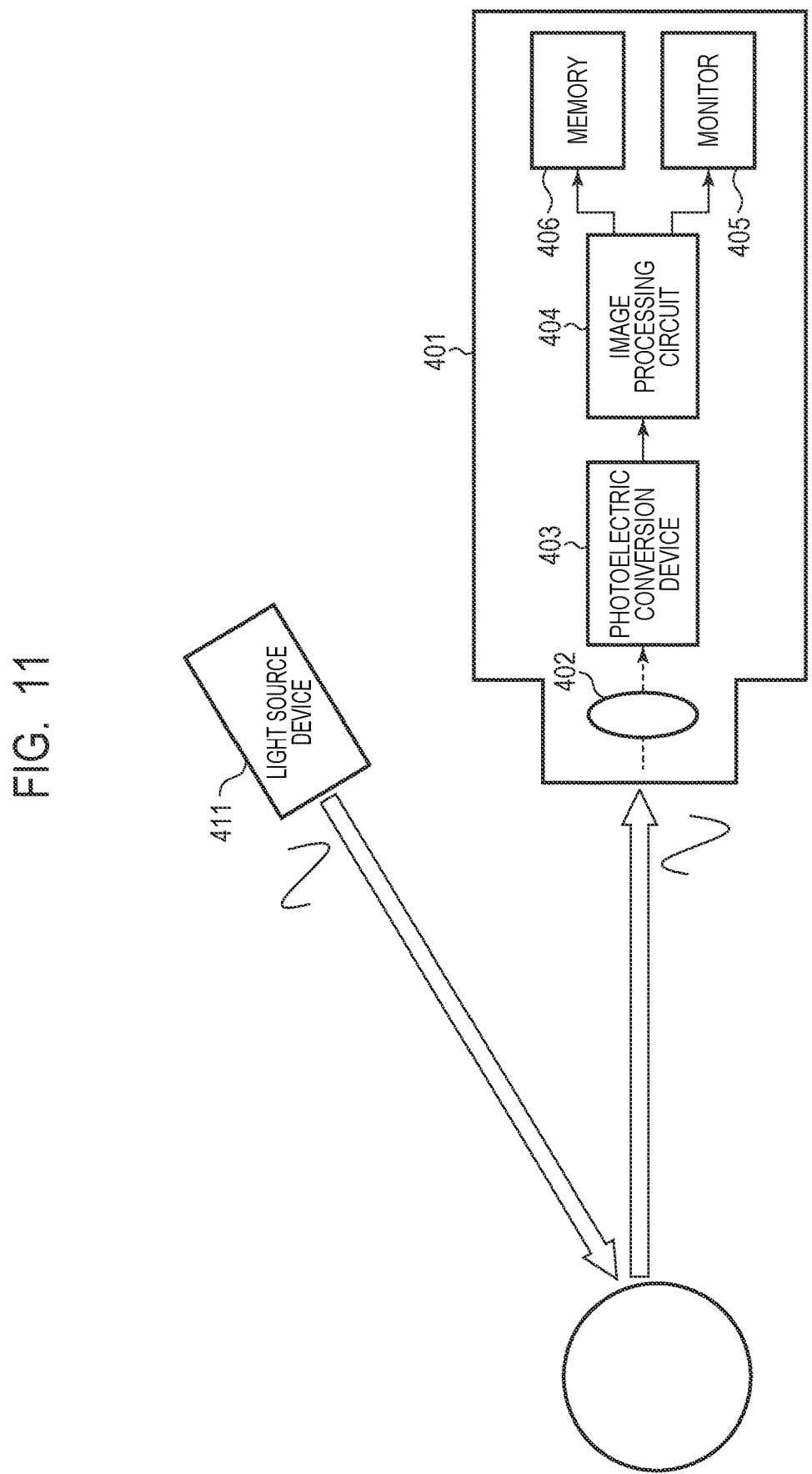
FIG. 11 is a block diagram of a light detection system according to a sixth embodiment.

FIG. 11 is a block diagram of a light detection system according to the present embodiment. More specifically, FIG. 11 is a block diagram of a distance image sensor using the photoelectric conversion device described in the above embodiment.

As illustrated in FIG. 11, the distance image sensor 401 includes an optical system 402, a photoelectric conversion device 403, an image processing circuit 404, a monitor 405, and a memory 406. The distance image sensor 401 receives light (modulated light or pulse light) emitted from the light source device 411 toward an object and reflected by the surface of the object. The distance image sensor 401 can acquire a distance image corresponding to a distance to the object based on a time period from light emission to light reception.

The optical system 402 includes one or a plurality of lenses, and guides image light (incident light) from the object to the photoelectric conversion device 403 to form an image on a light receiving surface (sensor unit) of the photoelectric conversion device 403.

As the photoelectric conversion device 403, the photoelectric conversion device of each of the embodiments described above can be applied. The photoelectric conversion device 403 supplies a distance signal indicating a distance obtained from the received light signal to the image processing circuit 404.

The image processing circuit 404 performs image processing for constructing a distance image based on the distance signal supplied from the photoelectric conversion device 403. The distance image (image data) obtained by the image processing can be displayed on the monitor 405 and stored (recorded) in the memory 406.

The distance image sensor 401 configured in this manner can acquire an accurate distance image by applying the photoelectric conversion device described above.

Seventh Embodiment

The technology according to the present disclosure can be applied to various products. For example, the technology according to the present disclosure may be applied to an endoscopic surgical system, which is an example of a light detection system.

Figure 12:
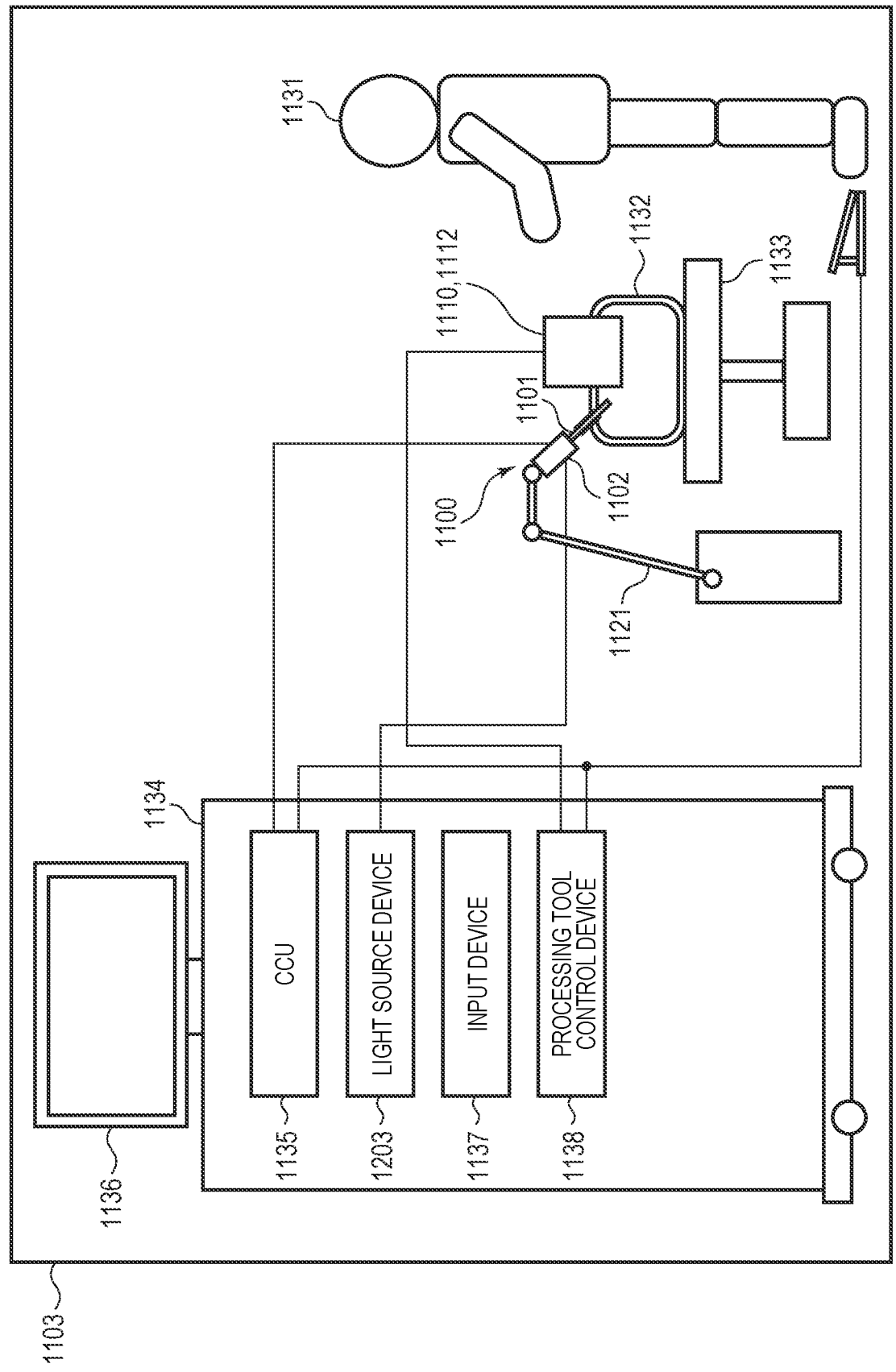
FIG. 12 is a schematic diagram of an endoscopic surgical system according to a seventh embodiment.

FIG. 12 is a schematic diagram of an endoscopic surgical system according to the present embodiment. FIG. 12 illustrates a state in which an operator (physician) 1131 performs surgery on a patient 1132 on a patient bed 1133 using an endoscopic surgical system 1103. As illustrated, the endoscopic surgical system 1103 includes an endoscope 1100, a surgical tool 1110, an arm 1121, and a cart 1134 on which various devices for endoscopic surgery are mounted.

The endoscope 1100 includes a barrel 1101 in which an area of a predetermined length from the distal end is inserted into a body cavity of a patient 1132, and a camera head 1102 connected to a proximal end of the barrel 1101. FIG. 12 illustrates an endoscope 1100 configured as a rigid scope having a rigid barrel 1101, but the endoscope 1100 may be configured as a flexible scope having a flexible barrel.

An opening into which an objective lens is fitted is provided at the distal end of the barrel 1101. A light source device 1203 is connected to the endoscope 1100. Light generated by the light source device 1203 is guided to the distal end of the barrel 1101 by a light guide extended inside the barrel 1101, and is irradiated to an observation target in the body cavity of the patient 1132 via an objective lens. The endoscope 1100 may be a straight-viewing scope an oblique-viewing scope, or a side-viewing scope.

An optical system and a photoelectric conversion device are provided inside the camera head 1102, and reflected light (observation light) from the observation target is focused on the photoelectric conversion device by the optical system. The observation light is photoelectrically converted by the photoelectric conversion device, and an electric signal corresponding to the observation light, that is, an image signal corresponding to an observation image is generated. As the photoelectric conversion device, the photoelectric conversion device described in each of the above embodiments can be used. The image signal is transmitted to a camera control unit (CCU) 1135 as RAW data.

The CCU 1135 includes a central processing unit (CPU), a graphics processing unit (GPU), and the like, and integrally controls operations of the endoscope 1100 and a display device 1136. Further, the CCU 1135 receives an image signal from the camera head 1102, and performs various types of image processing for displaying an image based on the image signal, such as development processing (demosaic processing).

The display device 1136 displays an image based on the image signal processed by the CCU 1135 under the control of the CCU 1135.

The light source device 1203 includes, for example, a light source such as a light emitting diode (LED), and supplies irradiation light to the endoscope 1100 when capturing an image of a surgical site or the like.

An input device 1137 is an input interface for the endoscopic surgical system 1103. The user can input various types of information and instructions to the endoscopic surgical system 1103 via the input device 1137.

A processing tool control device 1138 controls the actuation of the energy treatment tool 1112 for ablation of tissue, incision, sealing of blood vessels, and the like.

The light source device 1203 can supply irradiation light to the endoscope 1100 when capturing an image of a surgical site, and may be, for example, a white light source such as an LED, a laser light source, or a combination thereof. When a white light source is constituted by a combination of RGB laser light sources, the output intensity and output timing of each color (each wavelength) can be controlled with high accuracy. Therefore, the white balance of the captured image can be adjusted in the light source device 1203. In this case, laser light from each of the RGB laser light sources may be irradiated onto the observation target in a time-division manner, and driving of the imaging element of the camera head 1102 may be controlled in synchronization with the irradiation timing. Thus, images corresponding to R, G, and B can be captured in a time-division manner. According to such a method, a color image can be obtained without providing a color filter in the imaging element.

Further, the driving of the light source device 1203 may be controlled so that the intensity of the light output from the light source device 1203 is changed at predetermined time intervals. By controlling the driving of the imaging element of the camera head 1102 in synchronization with the timing of changing the intensity of light to acquire images in a time-division manner, and by synthesizing the images, it is possible to generate an image in a high dynamic range without so-called black out and white out.

Further, the light source device 1203 may be configured to be capable of supplying light in a predetermined wavelength band corresponding to special light observation. In the special light observation, for example, wavelength dependency of absorption of light in body tissue can be utilized. Specifically, predetermined tissues such as blood vessels in the surface layer of the mucosa are photographed with high contrast by irradiating light in a narrower band compared to the irradiation light (that is, white light) during normal observation. Alternatively, in the special light observation, fluorescence observation for obtaining an image by fluorescence generated by irradiation with excitation light may be performed. In the fluorescence observation, the body tissue can be irradiated with excitation light to observe fluorescence from the body tissue, or a reagent such as indocyanine green (ICG) can be locally injected to the body tissue and the body tissue can be irradiated with excitation light corresponding to the fluorescence wavelength of the reagent to obtain a fluorescence image. The light source device 1203 may be configured to supply narrowband light and/or excitation light corresponding to such special light observation.

Eighth Embodiment

A light detection system and A movable body of the present embodiment will be described with reference to FIGS. 13, 14A, 14B, 14C, and 15. In the present embodiment, an example of an in-vehicle camera is illustrated as a light detection system.

Figure 13:
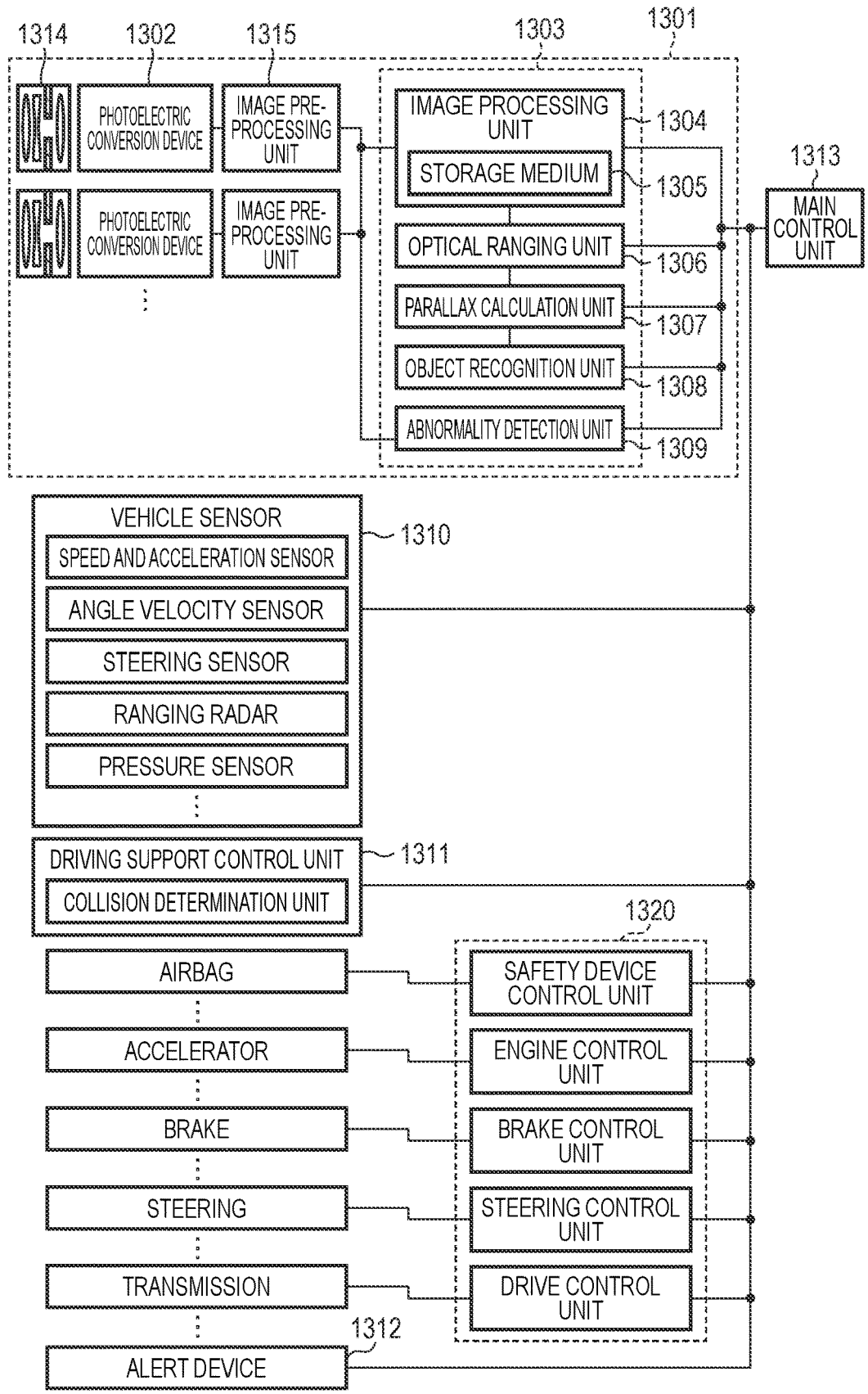
FIG. 13 is a schematic diagram of a light detection system according to an eighth embodiment.

FIG. 13 is a schematic diagram of a light detection system according to the present embodiment, and illustrates an example of a vehicle system and a light detection system mounted on the vehicle system. The light detection system 1301 includes photoelectric conversion devices 1302, image pre-processing units 1315, an integrated circuit 1303, and optical systems 1314. The optical system 1314 forms an optical image of an object on the photoelectric conversion device 1302. The photoelectric conversion device 1302 converts the optical image of the object formed by the optical system 1314 into an electric signal. The photoelectric conversion device 1302 is the photoelectric conversion device of any one of the above-described embodiments. The image pre-processing unit 1315 performs predetermined signal processing on the signal output from the photoelectric conversion device 1302. The function of the image pre-processing unit 1315 may be incorporated in the photoelectric conversion device 1302. The light detection system 1301 is provided with at least two sets of the optical system 1314, the photoelectric conversion device 1302, and the image pre-processing unit 1315, and an output signal from the image pre-processing units 1315 of each set is input to the integrated circuit 1303.

The integrated circuit 1303 is an integrated circuit for use in an imaging system, and includes an image processing unit 1304 including a storage medium 1305, an optical ranging unit 1306, a parallax calculation unit 1307, an object recognition unit 1308, and an abnormality detection unit 1309. The image processing unit 1304 performs image processing such as development processing and defect correction on the output signal of the image pre-processing unit 1315. The storage medium 1305 performs primary storage of captured images and stores defect positions of image capturing pixels.

The optical ranging unit 1306 focuses or measures the object. The parallax calculation unit 1307 calculates distance measurement information from the plurality of image data acquired by the plurality of photoelectric conversion devices 1302. The object recognition unit 1308 recognizes an object such as a car, a road, a sign, or a person. When the abnormality detection unit 1309 detects the abnormality of the photoelectric conversion device 1302, the abnormality detection unit 1309 issues an abnormality to the main control unit 1313.

The integrated circuit 1303 may be realized by dedicated hardware, a software module, or a combination thereof. It may be realized by a field programmable gate array (FPGA), an application specific integrated circuit (ASIC), or the like, or may be realized by a combination of these.

The main control unit 1313 controls overall operations of the light detection system 1301, a vehicle sensor 1310, a control unit 1320, and the like. Without the main control unit 1313, the light detection system 1301, the vehicle sensor 1310, and the control unit 1320 may individually have a communication interface, and each of them may transmit and receive control signals via a communication network, for example, according to the CAN standard.

The integrated circuit 1303 has a function of transmitting a control signal or a setting value to the photoelectric conversion device 1302 by receiving a control signal from the main control unit 1313 or by its own control unit.

The light detection system 1301 is connected to the vehicle sensor 1310, and can detect a traveling state of the host vehicle such as a vehicle speed, a yaw rate, a steering angle, and the like, an environment outside the host vehicle, and states of other vehicles and obstacles. The vehicle sensor 1310 is also a distance information acquisition unit that acquires distance information to the object. The light detection system 1301 is connected to a driving support control unit 1311 that performs various driving support functions such as an automatic steering function, an automatic cruise function, and a collision prevention function. In particular, with regard to the collision determination function, based on detection results of the light detection system 1301 and the vehicle sensor 1310, it is determined whether or not there is a possibility or occurrence of collision with another vehicle or an obstacle. Thus, avoidance control is performed when a possibility of collision is estimated and a safety device is activated when collision occurs.

The light detection system 1301 is also connected to an alert device 1312 that issues an alarm to a driver based on a determination result of the collision determination unit. For example, when the possibility of collision is high as the determination result of the collision determination unit, the main control unit 1313 performs vehicle control such as braking, returning an accelerator, suppressing engine output, or the like, thereby avoiding collision or reducing damage. The alert device 1312 issues a warning to a user using means such as an alarm of a sound or the like, a display of alarm information on a display unit screen such as a car navigation system and a meter panel, and a vibration application to a seatbelt and a steering wheel.

Figure 14A:
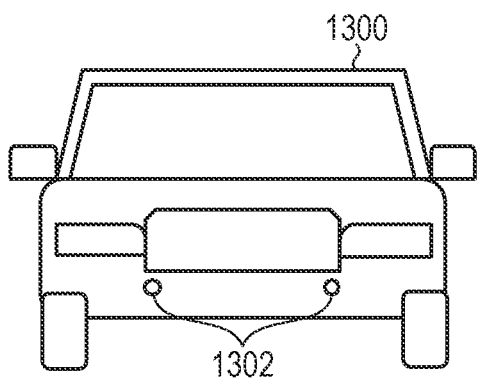
FIGS. 14A, 14B, and 14C are schematic diagrams of a movable body according to the eighth embodiment.
Figure 14B:
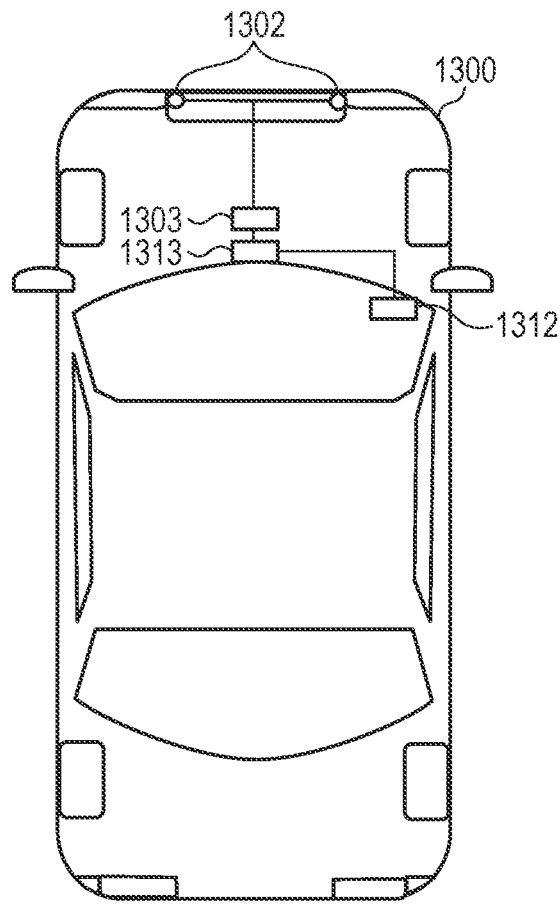
Figure 14C:
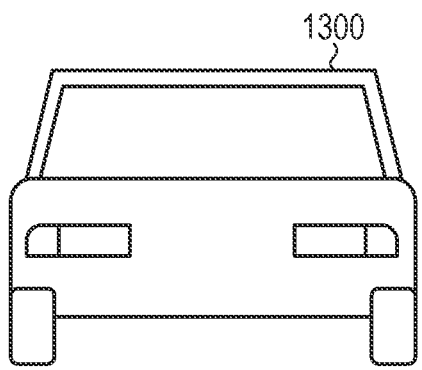

The light detection system 1301 according to the present embodiment can capture an image around the vehicle, for example, the front or the rear. FIGS. 14A, 14B, and 14C are schematic diagrams of a movable body according to the present embodiment, and illustrate a configuration in which an image of the front of the vehicle is captured by the light detection system 1301.

The two photoelectric conversion devices 1302 are arranged in front of the vehicle 1300. Specifically, it is preferable that a center line with respect to a forward/backward direction or an outer shape (for example, a vehicle width) of the vehicle 1300 be regarded as a symmetry axis, and two photoelectric conversion devices 1302 be arranged in line symmetry with respect to the symmetry axis. This makes it possible to effectively acquire distance information between the vehicle 1300 and the object to be imaged and determine the possibility of collision. Further, it is preferable that the photoelectric conversion device 1302 be arranged at a position where it does not obstruct the field of view of the driver when the driver sees a situation outside the vehicle 1300 from the driver's seat. The alert device 1312 is preferably arranged at a position that is easy to enter the field of view of the driver.

Figure 15:
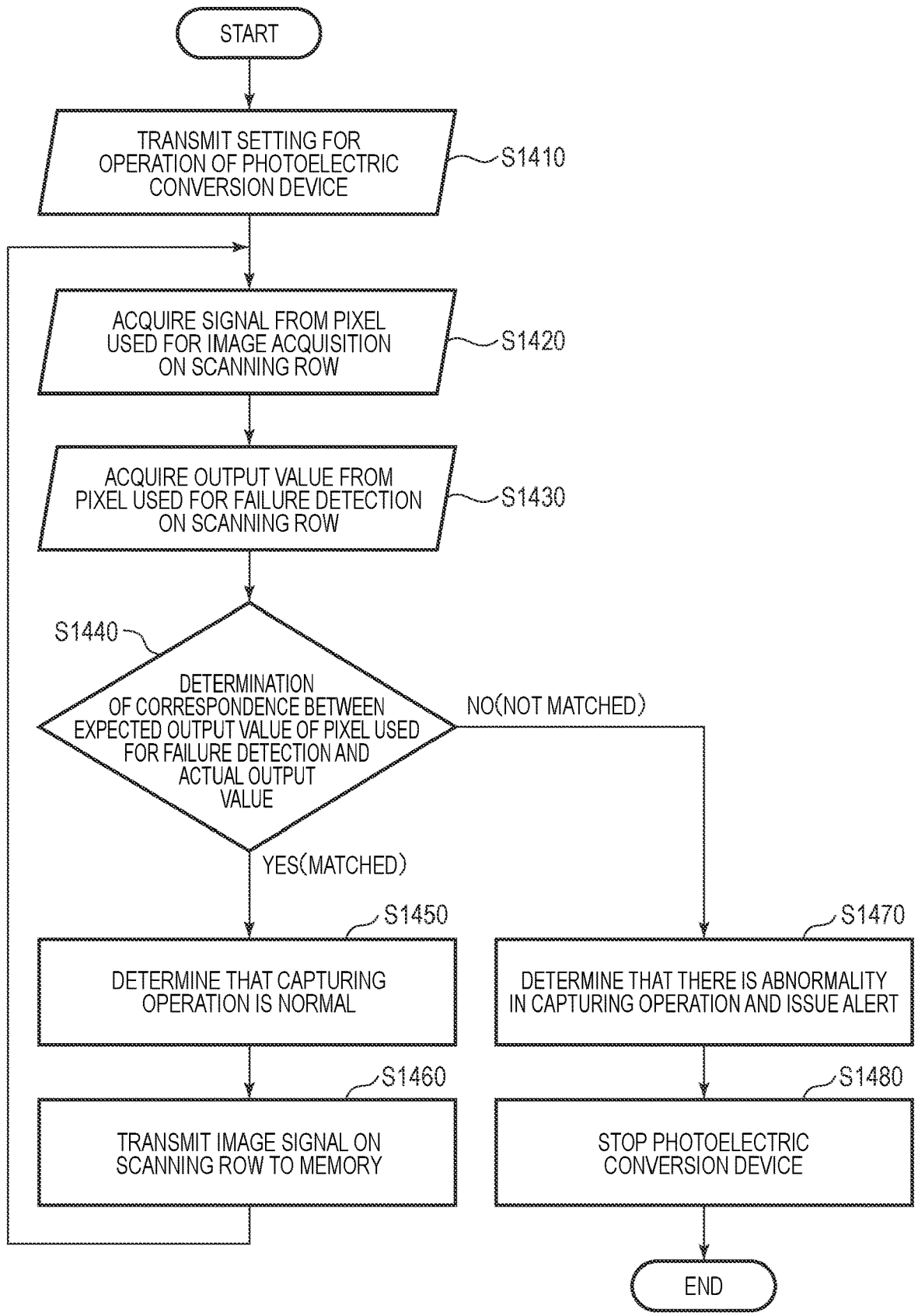
FIG. 15 is a flowchart illustrating an operation of the light detection system according to the eighth embodiment.

Next, a failure detection operation of the photoelectric conversion device 1302 in the light detection system 1301 will be described with reference to FIG. 15. FIG. 15 is a flowchart illustrating an operation of the light detection system according to the present embodiment. The failure detection operation of the photoelectric conversion device 1302 may be performed according to steps S1410 to S1480 illustrated in FIG. 15.

In step S1410, the setting at the time of startup of the photoelectric conversion device 1302 is performed. That is, setting information for the operation of the photoelectric conversion device 1302 is transmitted from the outside of the light detection system 1301 (for example, the main control unit 1313) or the inside of the light detection system 1301, and the photoelectric conversion device 1302 starts an imaging operation and a failure detection operation.

Next, in step S1420, the photoelectric conversion device 1302 acquires pixel signals from the effective pixels. In step S1430, the photoelectric conversion device 1302 acquires an output value from a failure detection pixel provided for failure detection. The failure detection pixel includes a photoelectric conversion element in the same manner as the effective pixel. A predetermined voltage is written to the photoelectric conversion element. The failure detection pixel outputs a signal corresponding to the voltage written in the photoelectric conversion element. Steps S1420 and S1430 may be executed in reverse order.

Next, in step S1440, the light detection system 1301 performs a determination of correspondence between the expected output value of the failure detection pixel and the actual output value from the failure detection pixel. If it is determined in step S1440 that the expected output value matches the actual output value, the light detection system 1301 proceeds with the process to step S1450, determines that the imaging operation is normally performed, and proceeds with the process to step S1460. In step S1460, the light detection system 1301 transmits the pixel signals of the scanning row to the storage medium 1305 and temporarily stores them. Thereafter, the process of the light detection system 1301 returns to step S1420 to continue the failure detection operation. On the other hand, as a result of the determination in step S1440, if the expected output value does not match the actual output value, the light detection system 1301 proceeds with the process to step S1470. In step S1470, the light detection system 1301 determines that there is an abnormality in the imaging operation, and issues an alert to the main control unit 1313 or the alert device 1312. The alert device 1312 causes the display unit to display that an abnormality has been detected. Then, in step S1480, the light detection system 1301 stops the photoelectric conversion device 1302 and ends the operation of the light detection system 1301.

Although the present embodiment exemplifies the example in which the flowchart is looped for each row, the flowchart may be looped for each plurality of rows, or the failure detection operation may be performed for each frame. The alert of step S1470 may be notified to the outside of the vehicle via a wireless network.

Further, in the present embodiment, the control in which the vehicle does not collide with another vehicle has been described, but the present embodiment is also applicable to a control in which the vehicle is automatically driven following another vehicle, a control in which the vehicle is automatically driven so as not to protrude from the lane, and the like. Further, the light detection system 1301 can be applied not only to a vehicle such as a host vehicle, but also to a movable body (movable apparatus) such as a ship, an aircraft, or an industrial robot. In addition, the present embodiment can be applied not only to a movable body but also to an apparatus utilizing object recognition such as an intelligent transport systems (ITS).

The photoelectric conversion device of the present disclosure may be a configuration capable of further acquiring various types of information such as distance information.

Ninth Embodiment

Figure 16A:
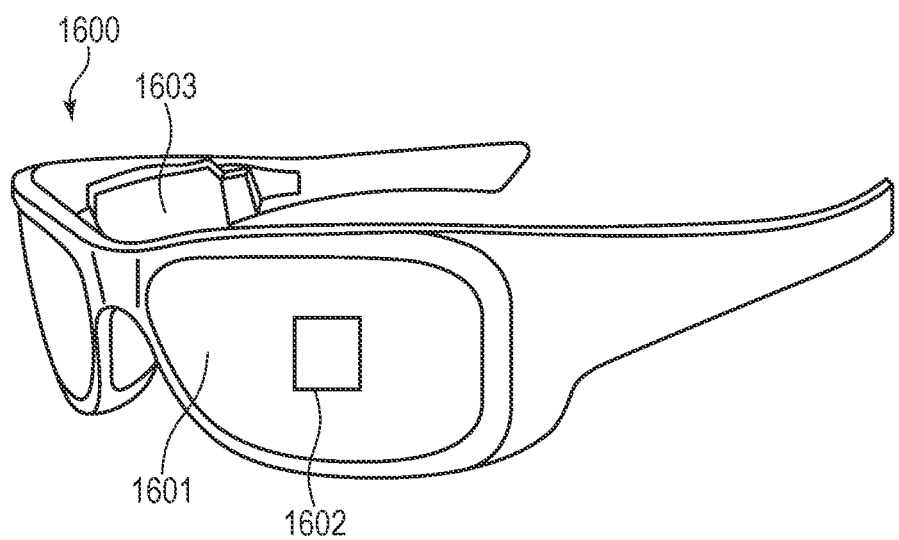
FIGS. 16A and 16B are diagrams illustrating a specific example of the electronic device according to a ninth embodiment.

FIG. 16A is a diagram illustrating a specific example of an electronic device according to the present embodiment, and illustrates glasses 1600 (smart glasses). The glasses 1600 are provided with the photoelectric conversion device 1602 described in the above embodiments. That is, the glasses 1600 are an example of a light detection system to which the photoelectric conversion device 1602 described in each of the above embodiments can be applied. A display device including a light emitting device such as an OLED or an LED may be provided on the back surface side of the lens 1601. One photoelectric conversion device 1602 or a plurality of photoelectric conversion devices 1602 may be provided. Further, a plurality of types of photoelectric conversion devices may be combined. The arrangement position of the photoelectric conversion device 1602 is not limited to that illustrated in FIG. 16A.

The glasses 1600 further comprise a control device 1603. The control device 1603 functions as a power source for supplying power to the photoelectric conversion device 1602 and the above-described display device. The control device 1603 controls operations of the photoelectric conversion device 1602 and the display device. The lens 1601 is provided with an optical system for collecting light to the photoelectric conversion device 1602.

Figure 16B:
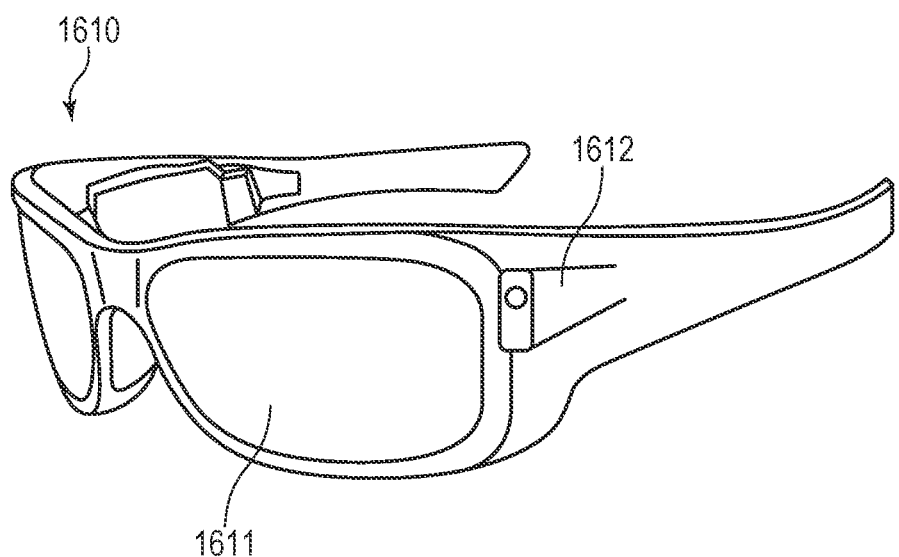

FIG. 16B illustrates glasses 1610 (smart glasses) according to one application. The glasses 1610 include a control device 1612, and a photoelectric conversion device corresponding to the photoelectric conversion device 1602 and a display device are mounted on the control device 1612. The lens 1611 is provided with a photoelectric conversion device in the control device 1612 and an optical system for projecting light emitted from a display device, and an image is projected on the lens 1611. The control device 1612 functions as a power source for supplying power to the photoelectric conversion device and the display device, and controls operations of the photoelectric conversion device and the display device. The control device 1612 may include a line-of-sight detection unit that detects the line of sight of the wearer. Infrared radiation may be used to detect the line of sight. The infrared light emitting unit emits infrared light to the eyeball of the user who is watching the display image. The reflected light of the emitted infrared light from the eyeball is detected by an imaging unit having a light receiving element, whereby a captured image of the eyeball is obtained. A reduction unit that reduces light from the infrared light emitting unit to the display unit in a plan view may be employed and the reduction unit reduces a degradation in image quality.

The control device 1612 detects the line of sight of the user with respect to the display image from the captured image of the eyeball obtained by imaging the infrared light. Any known method can be applied to the line-of-sight detection using the captured image of the eyeball. As an example, a line-of-sight detection method based on a Purkinje image due to reflection of irradiation light at a cornea can be used.

More specifically, a line-of-sight detection process based on a pupil cornea reflection method is performed. By using the pupil cornea reflection method, a line-of-sight vector representing a direction (rotation angle) of the eyeball is calculated based on the image of the pupil included in the captured image of the eyeball and the Purkinje image, whereby the line-of-sight of the user is detected.

The display device of the present embodiment may include a photoelectric conversion device having a light receiving element, and may control a display image of the display device based on line-of-sight information of the user from the photoelectric conversion device.

Specifically, the display device determines a first view field region gazed by the user and a second view field region other than the first view field region based on the line-of-sight information. The first view field region and the second view field region may be determined by a control device of the display device, or may be determined by an external control device. In the display area of the display device, the display resolution of the first view field region may be controlled to be higher than the display resolution of the second view field region. That is, the resolution of the second view field region may be lower than that of the first view field region.

The display area may include a first display region and a second display region different from the first display region. A region having a high priority may be determined from the first display region and the second display region based on the line-of-sight information. The first view field region and the second view field region may be determined by a control device of the display device, or may be determined by an external control device. The resolution of the high priority area may be controlled to be higher than the resolution of the region other than the high priority region. That is, the resolution of a region having a relatively low priority can be reduced.

It should be noted that an artificial intelligence (AI) may be used in determining the first view field region and the region with high priority. The AI may be a model configured to estimate an angle of a line of sight and a distance to a target on the line-of-sight from an image of an eyeball, and the AI may be trained using training data including images of an eyeball and an angle at which the eyeball in the images actually gazes. The AI program may be provided in either a display device or a photoelectric conversion device, or may be provided in an external device. When the external device has the AI program, the AI program may be transmitted from a server or the like to a display device via communication.

When the display control is performed based on the line-of-sight detection, the present embodiment can be preferably applied to a smart glasses which further includes a photoelectric conversion device for capturing an image of the outside. The smart glasses can display captured external information in real time.

Modified Embodiments

The present invention is not limited to the above embodiment, and various modifications are possible. For example, an example in which some of the configurations of any of the embodiments are added to other embodiments or an example in which some of the configurations of any of the embodiments are replaced with some of the configurations of other embodiments is also an embodiment of the present invention.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-171581, filed Oct. 20, 2021, which is hereby incorporated by reference herein in its entirety.

What is claimed is:

1. A photoelectric conversion device comprising:
a photodiode configured to perform avalanche multiplication;
a recharging circuit configured to perform a recharging operation to bring the photodiode after the avalanche multiplication into a state in which the avalanche multiplication can be performed again based on a first control signal including pulses that periodically repeat transitions from a first level to a second level; and
a counter configured to count the number of occurrences of the avalanche multiplication by being enabled based on a second control signal,
wherein before the counter is enabled based on the second control signal, the first control signal transitions from the first level to the second level and transitions from the second level to the first level.

2. The photoelectric conversion device according to claim 1, wherein the recharging circuit performs the recharging operation further based on a third control signal for enabling the recharging operation.

3. The photoelectric conversion device according to claim 2, wherein the enabling of the recharging operation based on the third control signal is performed before the enabling of the counter based on the second control signal.

4. The photoelectric conversion device according to claim 2 further comprising a first logic circuit configured to output a signal for controlling on or off of the recharging operation of the recharging circuit based on the first control signal and the third control signal.

5. The photoelectric conversion device according to claim 1 further comprising a second logic circuit configured to output a signal for changing a count value to the counter based on the second control signal and an output signal of the photodiode.

6. The photoelectric conversion device according to claim 1 further comprising a second logic circuit and a third logic circuit,
wherein the third logic circuit outputs a fourth control signal to the second logic circuit based on the first control signal and the second control signal, and
wherein the second logic circuit outputs a signal for changing a count value to the counter based on the fourth control signal and an output signal of the photodiode.

7. The photoelectric conversion device according to claim 1, wherein the recharging circuit performs the recharging operation further based on a fifth control signal for resetting a count value of the counter.

8. The photoelectric conversion device according to claim 7, wherein the recharging circuit performs the recharging operation at a timing when the count value is reset.

9. The photoelectric conversion device according to claim 7 further comprising a fourth logic circuit configured to output a signal for controlling on or off of the recharging operation of the recharging circuit based on the first control signal, a third control signal for enabling the recharging operation, and the fifth control signal.

10. The photoelectric conversion device according to claim 1, wherein a length of a period from when the recharging operation is performed to when the counter is enabled is equal to or less than a period of the pulses included in the first control signal.

11. A light detection system comprising:
the photoelectric conversion device according to claim 1; and
a signal processing unit configured to process a signal output from the photoelectric conversion device.

12. A movable body comprising:
the photoelectric conversion device according to claim 1;
a distance information acquisition unit configured to acquire distance information to an object from a signal output from the photoelectric conversion device; and
a control unit configured to control the movable body based on the distance information.

* * * * *